United States Patent [19]

Miyamoto et al.

[11] Patent Number: 4,903,951
[45] Date of Patent: Feb. 27, 1990

[54] FLUID-FILLED VIBROISOLATING DEVICE

[75] Inventors: Yasuo Miyamoto; Keiichi Uchiyama, both of Tochigi, Japan

[73] Assignee: Honda Giken Kogyo Kabushiki Kaisha, Tokyo, Japan

[21] Appl. No.: 192,443

[22] Filed: May 11, 1988

[30] Foreign Application Priority Data

May 12, 1987 [JP] Japan ............................. 62-115489
Jun. 19, 1987 [JP] Japan ............................. 62-152894
Mar. 3, 1988 [JP] Japan ............................. 62-48627

[51] Int. Cl.$^4$ ............................................. F16F 9/08
[52] U.S. Cl. ............................. 267/140.1; 248/562; 248/636
[58] Field of Search ............... 267/35, 121, 140.1, 267/141, 219; 248/659, 638, 562, 636

[56] References Cited

U.S. PATENT DOCUMENTS

| | | | |
|---|---|---|---|
| 4,635,910 | 1/1987 | Ozawa et al. | 267/140.1 |
| 4,645,189 | 2/1987 | Quast | 267/140.1 |
| 4,681,306 | 7/1987 | Hofmann et al. | 267/140.1 |
| 4,697,793 | 10/1987 | Reuter et al. | 267/140.1 |
| 4,733,854 | 3/1988 | Miyamoto | 267/140.1 |
| 4,757,982 | 7/1988 | Andra et al. | 267/140.1 |
| 4,773,634 | 9/1988 | Hamaekers | 267/140.1 |
| 4,834,349 | 5/1989 | Arai et al. | 267/140.1 |

FOREIGN PATENT DOCUMENTS

| | | | |
|---|---|---|---|
| 0133588 | 2/1985 | European Pat. Off. | 267/140.1 |
| 2712641 | 9/1978 | Fed. Rep. of Germany | 267/140.1 |
| 3439614 | 4/1986 | Fed. Rep. of Germany | 267/140.1 |
| 0149436 | 11/1980 | Japan | 267/140.1 |
| 0094145 | 6/1982 | Japan | 267/140.1 |
| 0151637 | 8/1984 | Japan | 267/140.1 |
| 59-151643 | 8/1984 | Japan | |
| 0175835 | 9/1985 | Japan | 267/140.1 |
| 60-263736 | 12/1985 | Japan | |
| 0031735 | 2/1986 | Japan | 267/140.1 |
| 0248934 | 11/1986 | Japan | 267/140.1 |
| 62-155243 | 10/1987 | Japan | |
| 62-155244 | 10/1987 | Japan | |
| 62-155245 | 10/1987 | Japan | |
| 62-292940 | 12/1987 | Japan | |
| 2079894 | 1/1982 | United Kingdom | 267/140.1 |
| 2144824 | 3/1985 | United Kingdom | 267/140.1 |

OTHER PUBLICATIONS

Copending commonly assigned U.S. application Ser. No. 215,660; Filed: Jul. 6, 1988; By: Miyamoto et al, For: MOUNT.

Primary Examiner—Andres Kashnikow
Assistant Examiner—Mark T. Le
Attorney, Agent, or Firm—Armstrong, Nikaido, Marmelstein, Kubovcik & Murray

[57] ABSTRACT

A fluid-filled vibroisolating device comprises a joint member adapted to be joined to a vibrating body such as an engine. A support member is adapted to be supported on a supporting body such as a vehicle frame and defining an expandable and contractible auxiliary fluid chamber filled with a fluid. An elastomeric member interconnects the joint and support members and is disposed in a vibrating direction in which the vibrating body vibrates. The elastomeric member, the joint member, and the support member jointly define an expandable and contractible main fluid chamber filled with a fluid. A partition is mounted in the support member and separates the main and auxiliary fluid chambers from each other. The partition has flow regulators for regulating the flow of the fluid between the main and auxiliary fluid chamber. A reinforcing member is integrally formed with the elastomeric member for preventing the elastomeric member from being collapsed. By selecting various parameters of the device to meet a predetermined equation, and providing as the flow regulating mechanism an orifice between the main and auxiliary fluid chambers for allowing the fluid to flow or resonate, and also a movable plate movable dependent on the difference between the fluid pressures in the main and auxiliary fluid chambers, the damping capability of the fluid-filled vibroisolating device is improved and the dynamic spring constant thereof is uniformly lowered in a wide range of frequencies.

17 Claims, 21 Drawing Sheets

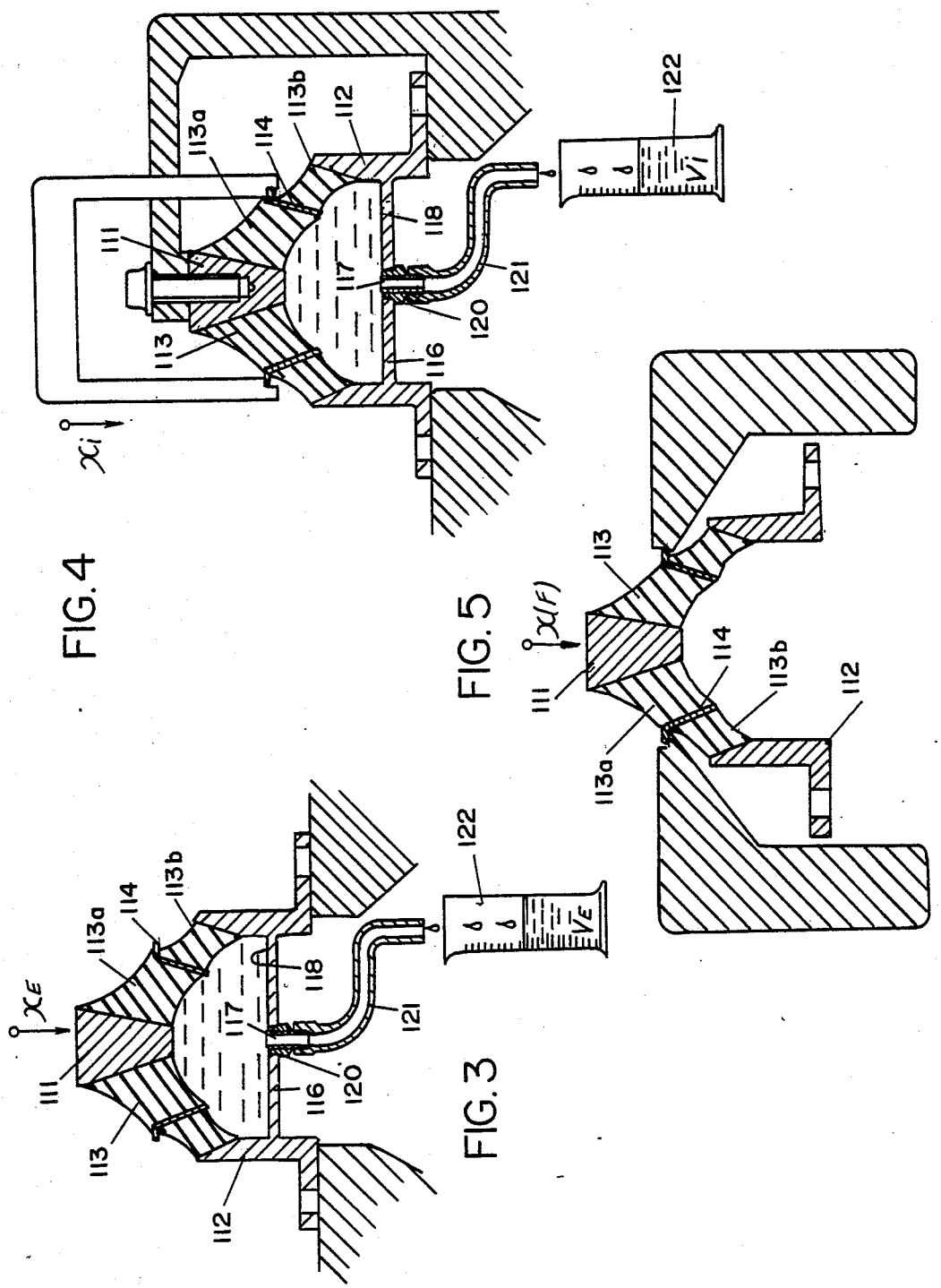

FLUID-FILLED VIBROISOLATING DEVICE

BACKGROUND OF THE INVENTION

1. Field of the Invention:

The present invention relates to a fluid-filled vibroisolating device having an expandable and contractable fluid chamber made of an elastomeric material or the like and filled with a fluid, and more particularly to a fluid-filled vibroisolating device for use as a vibroisolating or vibration damping support for a power unit such as an automotive engine or the like.

2. Description of the Relevant Art:

Motor vehicles such as automobiles develop various vibrations of different frequencies and amplitudes dependent on operating conditions such as engine rotational speeds, varying road surfaces, and the like. Therefore, the motor vehicles are required to be equipped with vibroisolating or vibration damping devices capable of absorbing or damping vibrations in a wide range of frequencies and amplitudes.

Known vibroisolating devices include a fluid-filled vibroisolating device comprising a support member on which a vibrating body such as an engine is mounted, a support member installed on a support body such as a vehicle frame, and an elastomeric body of rubber, for example, having opposite ends fixed to the support members and defining a main fluid chamber therein. The fluid-filled vibroisolating device also includes an auxiliary fluid chamber communicating with the main fluid chamber through an orifice. The main and auxiliary fluid chambers are filled with a noncompressible fluid such as water, oil, or the like.

The main and auxiliary fluid chambers are divided by a partition which has the orifice providing fluid communication between the main and auxiliary fluid chambers. Vibration of the engine is generally absorbed and/or dampened by elastic deformation of the elastomeric body and the flow of the fluid through the orifice between the main and auxiliary fluid chambers.

There has been a demand for improved dynamic spring characteristics and improved damping capability for such fluid-filled vibroisolating devices. Japanese Laid-Open Patent Publication No. 60-263736 discloses a fluid-filled mount as one example of the fluid-filled vibroisolating device. The publication discloses that by causing the fluid flowing through the orifice to resonate, a loss coefficient, i.e., a damping coefficient at a desired frequency of vibration can be increased and a dynamic spring coefficient can be reduced.

Though the disclosed fluid-filled mount somewhat improves its dynamic spring characteristics and damping characteristics, it is desired that these characteristics should be more improved.

More specifically, the elastomeric body of the mount which substantially defines the main fluid chamber is low in rigidity in a direction (hereinafter referred to as an expanding direction) normal to the direction of vibration, and tends to collapse when the exciting force for developing the vibration is large. To eliminate this drawback, there has been proposed in recent years a mount including an intermediate reinforcing member which reinforces an elastomeric body to increase its rigidity. In the proposed mount, the elastomeric body which defines a main fluid chamber is divided into two elastomeric members which are joined to each other by the intermediate reinforcing member for thereby increasing the rigidity of the entire elastomeric body in the expanding direction to guard against collapsing under strong vibration. Since, however, the intermediate reinforcing member which has a relatively large mass is positioned between the vibrating elastomeric members, these members constitute a vibratory system causing the intermediate reinforcing member to vibrate. As shown in FIG. 8, the vibration of the intermediate reinforcing member is liable to give rise to peaks of the dynamic spring constant of the entire system at medium and high frequencies, with the result that the transmission of vibration in certain frequency ranges, particularly medium and high frequency ranges, to the vehicle frame cannot effectively be reduced. To minimize adverse effects resulting from the use of the intermediate reinforcing member, the shape and weight of the intermediate reinforcing member have to be strictly designed, and the range of shapes and weights thereof that are available is considerably limited.

The orifice may be formed in various shapes in order to cause the fluid flowing therethrough to flow desirably or resonate at appropriate timing. An orifice shape has been desired which can achieve a uniform reduction in the dynamic spring constant in a wide range of frequencies, particularly a high frequency range.

In view of the problems of the conventional fluid-filled vibroisolating device, it is an object of the present invention to provide a fluid-filled vibroisolating device which has an improved damping capability and can reduce the dynamic spring constant uniformly in a wide range of frequencies.

According to the present invention, there is provided a fluid-filled vibroisolating device comprising a joint member adapted to be joined to a vibrating body such as an engine, a support member adapted to be supported on a supporting body such as a vehicle frame and defining an expandable and contractable auxiliary fluid chamber filled with a fluid, an elastomeric member interconnecting the joint and support members and disposed in a vibrating direction in which the vibrating body vibrates, the elastomeric member, the joint member, and the support member jointly defining an expandable and contractable main fluid chamber filled with a fluid, a partition mounted in the support member and separating the main and auxiliary fluid chambers from each other, the partition having flow regulating means for regulating the flow of the fluid between the main and auxiliary fluid chambers, and a reinforcing member integrally formed with the elastomeric member for preventing the elastomeric member from being collapsed. Various parameters of the fluid-filled vibroisolating device are selected to approximately meet the equation:

$$\frac{kl}{k} = \frac{Si}{SE} \times \frac{(K-k)}{k}$$

where SE is the effective fluid draining area which contributes to a change in the volume of the main fluid chamber when the joint member is displaced with the support member fixed, Si is the effective fluid draining area which contributes to a change in the volume of the main fluid chamber when the reinforcing member is displaced in the vibrating direction with the joint and support members fixed, k1 is the static spring constant when the joint member is displaced in the vibrating direction with the main fluid chamber open and the reinforcing member fixed, k is the static spring constant when the joint and support members are relatively displaced in the vibrating direction with the main fluid chamber open, and K is the static spring constant when the joint and support members are relatively displaced in the vibrating direction with the flow regulating means closed.

With this construction, the reinforcing member is prevented from being vibrated, and the dynamic spring characteristics of the entire device is not affected by the reinforcing member. The dynamic spring constant of the device is uniformly lowered in a full range of vibration frequencies for thereby reducing vibration transmitted.

The partition has a storage chamber defined therein and held in communication with the main and auxiliary fluid chambers through a plurality of first orifices opening into the main fluid chamber and a plurality of second orifices opening into the auxiliary fluid chamber in coaxial relation to the first orifices as pairs. The flow regulating means comprises a movable plate movably disposed in the storage chamber and movable at least axially of the first and second orifices dependent on the difference between fluid pressures in the main and auxiliary fluid chambers, the first and second orifices having openings opening toward the movable plate, the openings of at least one of the first and second orifices having tapered portions flaring toward the movable plate.

When vibration of a small amplitude is applied to the device, the movable plate is moved to absorb a change in the fluid pressure, and the elastomeric member is prevented from resonating through resonant action due to the mass of the fluid in the orifices and a spring component of the elastomeric member relative to the fluid pressure, so that the dynamic spring characteristics can be prevented from being lowered. The movable plate in the storage chamber has a small area of contact with other members, for effectively contributing to the absorption of changes in the fluid pressure and the prevention of resonance of the elastomeric member. When vibration with a large amplitude is applied, the movable plate is not moved, but the fluid pressure is increased for higher vibration damping capability.

The partition comprises an upper plate comprising a base plate in the form of a thin metallic sheet and an elastomeric body bonded thereto, and a lower plate in the form of a thin metallic sheet. Therefore, orifices of complex shape can be defined in the partition, and any burrs on the partition can easily be removed.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a view showing an arrangement for measuring an effective fluid draining area SE in the fluid-filled vibroisolating device shown in FIG. 1;

FIG. 4 is a view showing an arrangement for measuring an effective fluid draining area Si in the fluid-filled vibroisolating device shown in FIG. 1;

FIG. 5 is a view showing an arrangement for measuring static spring constants k, k1, K in the fluid-filled vibroisolating device shown in FIG. 1;

DETAILED DESCRIPTION OF THE PREFERRED EMBODIMENTS

FIGS. 1 through 7 show a fluid-filled vibroisolating device according to a first embodiment of the present invention.

The fluid-filled vibroisolating device according to the first embodiment will hereinafter be described as being employed for supporting a power unit such as an automotive engine.

Figure 1:
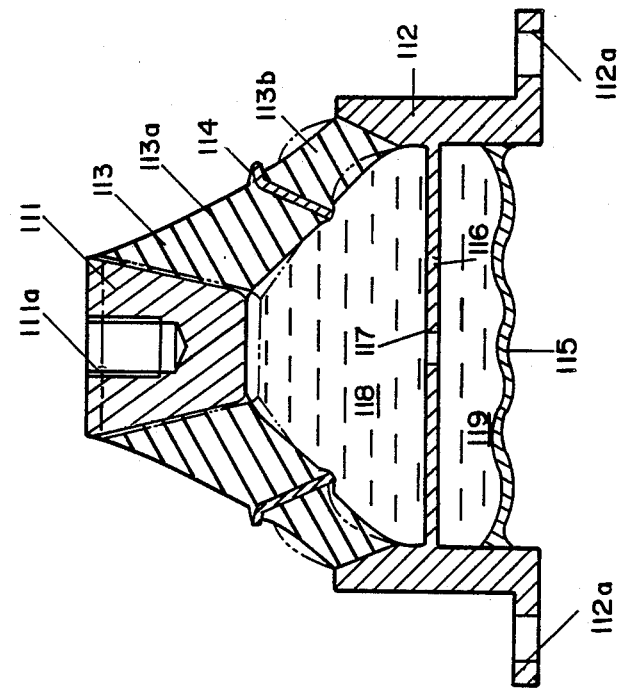
FIG. 1 is a cross-sectional view of a fluid-filled vibroisolating device according to a first embodiment of the present invention.
Figure 8:
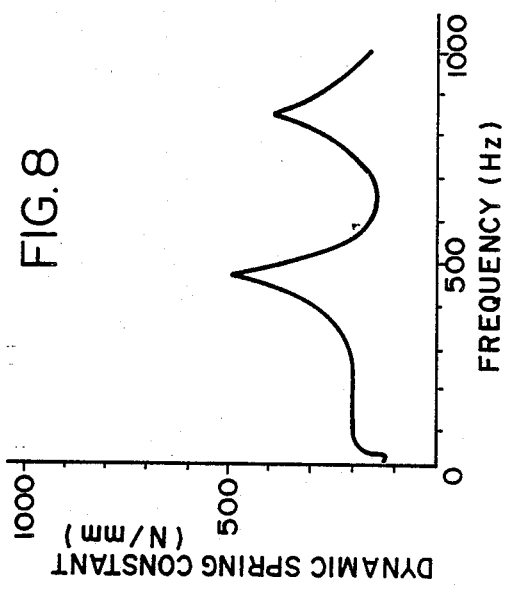
FIG. 8 is a diagram of the characteristic curve of a dynamic spring constant of a conventional fluid-filled vibroisolating device.

As shown in FIG. 1, the fluid-filled vibroisolating device includes a substantially column-shaped joint member 111 to be attached to the power unit, a substantially tubular support member to be mounted on a vehicle frame, and an elastomeric member 113 made of an elastomeric material such a rubber interposed between and joined to the members 111, 113. The joint member 111 has a threaded hole 111a and is coupled to the power unit by a bolt threaded into the hole 111a. Likewise, the support member 112 has attachment holes 112a and is fastened to the vehicle frame by bolts inserted through the attachment holes 112a. In the illustrated embodiment, the elastomeric member 113 is divided into two elastomeric bodies 113a, 113b joined to each other by an intermediate reinforcing member 114 of a highly rigid material such as metal. However, the elastomeric member 113 may be constructed otherwise. The elastomeric body 113a has an upper end (as shown) fixed to the joint member 111, and the elastomeric body 113b has a lower end (as shown) fixed to the support member 112. The intermediate reinforcing member 114 makes the elastomeric member 113 highly rigid in an expanding direction which is a horizontal direction in FIG. 1.

To the support member 112, there is affixed an elastically deformable diaphragm 115 of an elastomeric material such as rubber or the like at a lower inner peripheral surface of the support member 112. The support member 112 has a partition member 116 therein which has a flow passage 117 in the form of an orifice in the illustrated embodiment located above the diaphragm 115, the flow passage 117 serving as a means for regulating the flow of a fluid therethrough.

The members 111, 112, the elastomeric member 113, and the partition 116 jointly define an expandable and contractable main fluid member 118 filled with a fluid such as oil or the like. The support member 112, the diaphragm 115, and the partition member 116 jointly define an expandable and contractable auxiliary fluid chamber 119 filled with a fluid such as oil or the like. The main and auxiliary fluid chambers 118, 119 are held in fluid communication with each other through the flow passage 117 defined through the partition member 116.

The fluid-filled vibroisolating device of the first embodiment has various parameters which are selected appropriately as described later on, such that when the members 111, 112 are relatively displaced vertically by the vibration of the power unit or the vehicle frame, the elastomeric bodies 113a, 113b are elastically deformed as indicated by the two-dot-and-dash lines in FIG. 1, without causing vibration of the intermediate reinforcing member 114. When vibration is applied with a large amplitude at a low frequency, the elastomeric bodies 113a, 113b are largely deformed to cause the main fluid chamber 118 to change largely in its volume. The fluid is forced to flow through the flow passage 117 between the main and auxiliary fluid chambers 118, 119 for thereby dampening the vibration. It is also possible to uniformly reduce a dynamic spring constant with respect to vibration with a small amplitude at a high frequency, so that the transmission to the vehicle body of secondary vibration of the engine or the like which tends to produce confined sound in the automobile cabin can effectively be reduced.

More specifically, it is assumed that an effective fluid draining area which contributes to a change in the volume of the main fluid chamber 118 when the joint member 111 is vertically displaced (in the vibrating direction) with the support member 112 fixed is indicated by SE, an effective fluid draining area which contributes to a change in the volume of the main fluid chamber 118 when the intermediate reinforcing member 114 is displaced in the vibrating direction with the members 111, 112 fixed is indicated by Si, a static spring constant when the joint member 111 is displaced in the vibrating direction with the flow passage 117 open and the intermediate reinforcing member 114 fixed is indicated by k1, a static spring constant when the members 111, 112 are relatively displaced in the vibrating direction with the flow passage 117 open is indicated by k, and a static spring constant when the members 111, 112 are relatively displaced in the vibrating direction with the flow passage 117 closed is indicated by K. These areas SE, Si, and the static spring constants k1, k, K are selected to approximately meet the following equation (1):

$$\frac{kl}{k} = \frac{Si}{SE} \times \frac{(K-k)}{k} \qquad (1)$$

Figure 2:
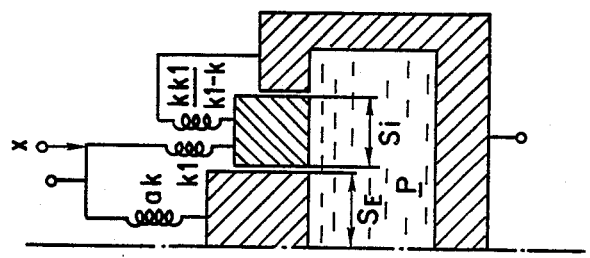
FIG. 2 is a diagram showing a vibration model of the fluid-filled vibroisolating device shown in FIG. 1.

The fluid-filled vibroisolating device thus constructed is represented by a vibration model shown in FIG. 2. When the joint member 111 is displaced downwardly by $\chi$ in response to vibration of the power unit, a pressure P indicated by the equation (2) below is developed in the main fluid chamber 118. The pressure P serve to produce a force Fp indicated by the equation (3) below, the force Fp tending to push the intermediate reinforcing member 114 upwardly. The resiliency of the elastomeric body 113a produces a force Fk indicated by the equation (4) below, tending to push the intermediate reinforcing member 114 downwardly.

$$P = \frac{a \cdot k \cdot \chi}{SE} \qquad (2)$$

$$Fp = PSi \qquad (3)$$
$$= ak\chi \frac{Si}{SE}$$

$$Fk = kl \cdot \chi \qquad (4)$$

where $$a = \frac{(K - k)}{k}$$

The aforesaid embodiment fulfills the equation (1), and using a, the equation (1) can be expressed as follows:

$$kl = a \cdot k \times \frac{Si}{SE} \quad (1')$$

Figure 7:
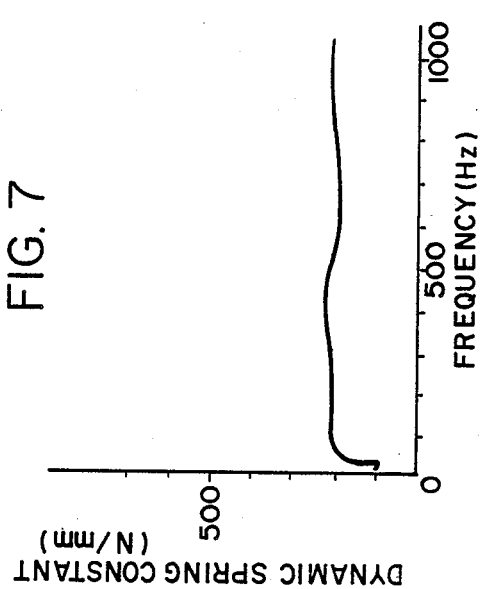
FIG. 7 is a diagram of the characteristic curve of a dynamic spring constant of the fluid-filled vibroisolating device shown in FIG. 1.

By putting the equation (1') into the equation (3), the force Fp is equalized to the force Fk indicated by the equation (4). Thus, the forces Fp, Fk acting on the intermediate reinforcing member 114 are kept in equilibrium, so that the intermediate reinforcing member 114 is not vibrated. Therefore, the characteristics of fluid-filled vibroisolating device such as the dynamic spring constant are not affected by the intermediate reinforcing member 114. The dynamic spring constant has a characteristic curve as shown in FIG. 7 for effectively reducing vibration which is transmitted to the vehicle body.

Measurement of the effective fluid draining areas SE, Si will be described with reference to FIGS. 3 and 4, and measurement of the static spring constants k, k1, K will be described with reference to FIG. 5.

First, measurement of the effective fluid draining area SE will be described. As shown in FIG. 3, the effective fluid draining area SE is determined by applying a displacement χE to the joint member 111 with the support member 112 fixed, introducing the fluid discharged from the main fluid chamber 118 by the displacement χE of the joint member 111 through a nipple 120 and a hose 121 into a measuring container 122 and measuring the amount of the discharged fluid, and dividing the measured amount VE of the fluid by the displacement χE of the joint member 111 as indicated by the following equation (5):

$$SE = \frac{VE}{\chi E} \quad (5)$$

Likewise, as shown in FIG. 4, the effective fluid draining area Si is determined by applying a displacement χi to the intermediate reinforcing member 114 with the members 111, 112 fixed, and dividing the amount Vi of the fluid discharged from the main fluid chamber 118 at this time by the displacement χi of the intermediate reinforcing member 114 (according to Vi/χi).

As illustrated in FIG. 5, the static spring constant k1 is determined by opening the main fluid chamber 118 and fixing the intermediate reinforcing member 114, measuring a displacement χ1 produced when the joint member 111 is pushed downwardly under a force F1, and dividing the force F1 by the displacement χ1 as indicated by the following equation (6):

$$kl = \frac{F1}{\chi 1} \quad (6)$$

Similarly, the static spring constant k is determined by opening the main fluid chamber 118, measuring a relative displacement χ produced when the members 111, 112 are pushed vertically under a force F, and dividing the force F by the displacement χ. Likewise, the static spring constant K is determined by closing the flow passage 117 as with a plug, measuring a relative displacement χo produced when the members 111, 112 are pushed vertically under a force Fo, and dividing the force Fo by the relative displacement χo.

A fluid-filled vibroisolating device according to a modification of the first embodiment will be described with reference to FIG. 6.

Figure 6:
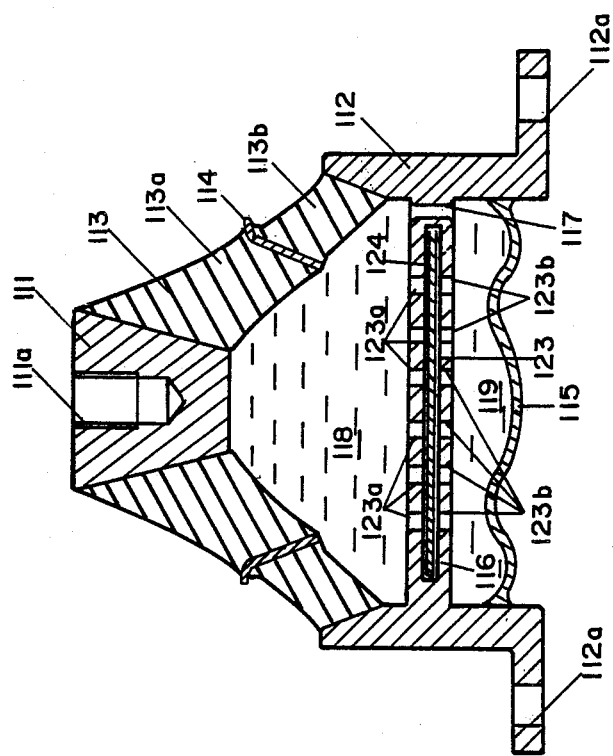
FIG. 6 is a cross-sectional view of a modification of the fluid-filled vibroisolating device shown in FIG. 1.

Those parts in FIG. 6 which are identical to those of the first embodiment are denoted by identical reference numerals and will not be described in detail.

The partition member 116 has, in addition to the flow passage 117, a storage chamber 123 defined therein and held in communication with the main and auxiliary fluid chambers 118, 119 through a plurality of orifices 123a, 123b. A floating plate 124 is floatingly stored in the storage chamber 123, the floating plate 124 being capable of closing the orifices 123a or the orifices 123b at a time. The flow passage 117 is defined in an outer peripheral edge of the partition member 116.

When vibration is applied with a small amplitude at a high frequency (higher than about 200 through 300 [Hz]) to the fluid-filled vibroisolating device, the fluid flows between the main and auxiliary fluid chambers 118, 119 through the orifices 123a, 123b and the storage chamber 123, and also through the flow passage 117. Under vibration with a large amplitude at a low frequency, the floating plate 124 closes the orifices 123a or the orifices 123b, allowing the fluid to flow only through the flow passage 117 between the main and auxiliary fluid chambers 118, 119. Therefore, as with the fluid-filled vibroisolating device of the first embodiment, the fluid-filled vibroisolating device shown in FIG. 6 can effectively dampen the vibration with a large amplitude at a low frequency, and can reduce the dynamic spring constant with respect to the vibration with a small amplitude at a high frequency, so that the transmission of vibration to the vehicle body can be lowered.

The effective fluid draining areas SE, Si and the static spring constants k1, k, K of the fluid-filled vibroisolating device of FIG. 6 also fulfill the equation (1) above. Consequently, the intermediate reinforcing member 114 is prevented from vibrating particularly in a low frequency range in which the orifices 123a or the orifices 123b are closed by the floating plate 124, so that the dynamic spring constant characteristics as shown in FIG. 7 can be obtained.

As described above, with the fluid-filled vibroisolating devices of the first embodiment and its modification, the dynamic spring constant can be reduced in a wide range of frequencies according to a flat characteristic curve while increasing the rigidity of the elastomeric bodies in the expanding direction, and the transmission of vibration can effectively be lowered.

Figure 9:
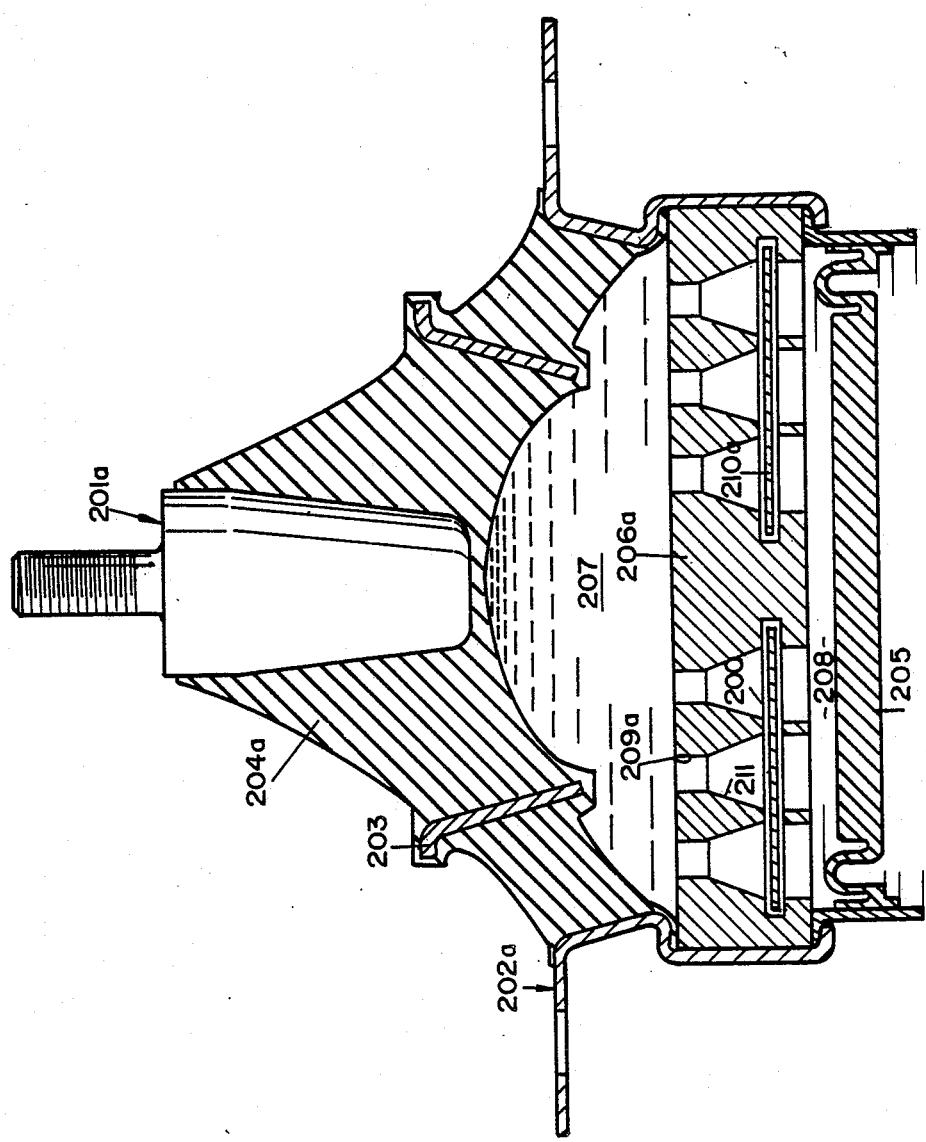
FIG. 9 is a cross-sectional view of a fluid-filled vibroisolating device according to a second embodiment of the present invention.

Fluid-filled vibroisolating devices according to a second embodiment and its modifications will now be described with reference to FIGS. 9 through 25. FIG. 9 shows a fluid-filled vibroisolating device of a second embodiment which comprises a joint member 201a to be attached to a vibrating body, an annular support member 202ato be mounted on a support body on which the vibrating body is to be installed, and an annular elastomeric member 204a reinforced with an annular reinforcing member 203 and interconnecting the joint member 201a and the support member 202a. The support member 202a has an annular barrel having an attachment flange on one of its vertical ends. The elastomeric member 204a is fixed to the support member 202a along the end near the attachment flange. A diaphragm 205 has an outer peripheral edge joined to the inner peripheral surface of the other end of the barrel of the support member 202a. The elastomeric member 204a, the support member 202a, and the diaphragm 205 jointly define a fluid chamber filled with a noncompressible fluid. A partition 206a is disposed in the fluid chamber and has its outer peripheral edge fixed to the inner peripheral surface of the barrel of the support member 202a. The partition 206a divides the fluid chamber into an expandable and contractable first fluid chamber 207 adjoining to the elastomeric member 204a, and an expandable and contractable second fluid chamber 208 adjoining to the diaphragm 205. The partition 206a has a number of orifices 209a defined therein and extending from the first fluid chamber 207 to the second fluid chamber 208. A movable plate 210a is disposed in the partition 206a across the orifices 209a and movable or vibratable in the orifices 209a dependent on a change in the pressure of the fluid. Each of the orifices 209a has a flaring or tapered portion 211 near the first fluid chamber 207 and flaring toward the movable plate 210a.

More specifically, as shown in FIG. 9, each of the orifices 209a has an upper orifice portion opening toward the first fluid chamber 207 and a lower orifice portion extending downwardly coaxially from the upper orifice portion and opening toward the second fluid chamber 208. The partition 206a has a storage chamber 200 defined therein across the orifices 209a and held in communication with the fluid chambers 207, 208 through the orifices 209a. The movable plate 210a which is movable at least axially of the orifices 209a dependent on the difference between the fluid pressures in the fluid chambers 207, 208 is disposed in the storage chamber 200. The movable plate 210a serves as a flow regulating means. As described above, the upper orifice portion of each of the orifices 209a includes a tapered or flaring portion flaring toward the movable plate 210a.

The effective length L of the orifices 209a and their inlet area (cross-sectional) area of the smaller-diameter portion thereof) Sw are given by the following equation:

$$\frac{L}{Sw} \approx \frac{4 \cdot k}{4 \cdot \pi^2 \cdot f1^2 \cdot S'E^2 \cdot \rho}$$

Where k is the product of the static spring constant of the elastomeric member 204a and the dynamic magnification thereof at a resonant frequency, S'E is the amount of change in the volume of the first fluid chamber 207 per unit relative displacement between the joint member 201a and the support member 202a.

f1 is the resonant frequency of the elastomeric member 204, and $\rho$ is the density of the filled fluid.

The appropriate relationship between L and Sw can be determined by putting the measured values of k, f1, S'E, and $\rho$ into the above equation. By thus setting L and Sw to optimized values, the resonance of the elastomeric member 204a can be suppressed through the resonant action of the fluid in the orifices 209a.

Figure 23:
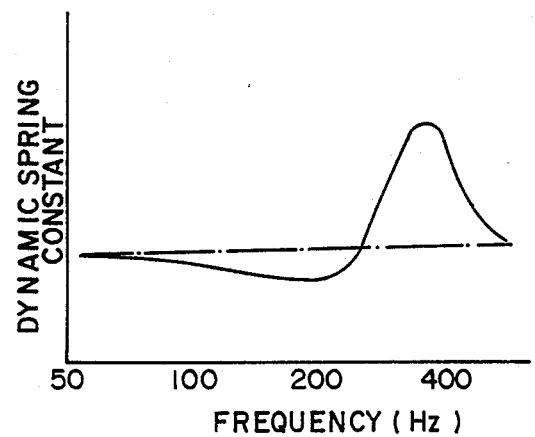
FIG. 23 is a diagram of a dynamic spring constant characteristic curve obtained when an orifice diameter is smaller or an effective length is greater in the fluid-filled vibroisolating device according to second embodiment shown in FIG. 9.
Figure 24:
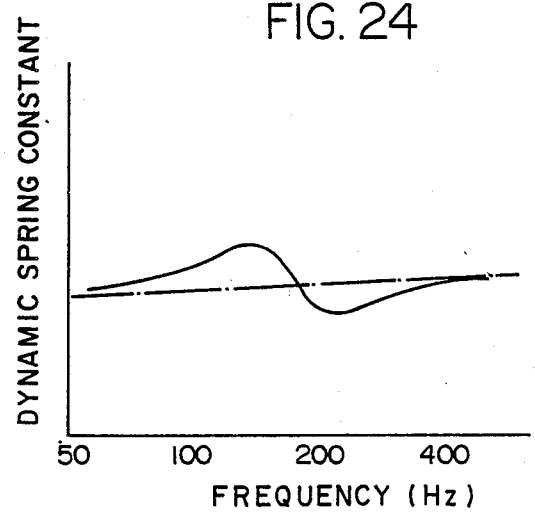
FIG. 24 is a diagram of a dynamic spring constant characteristic curve obtained when an orifice diameter is greater or an effective length is smaller in the fluid-filled vibroisolating device according to second embodiment shown in FIG. 9.

If the orifices 209a for suppressing the resonance of the elastomeric member 204a, i.e., antiresonant orifices, are designed for a smaller diameter or a larger effective length to shift the resonant frequency of the fluid in the orifices 209a toward a lower frequency then the dynamic spring constant becomes higher in a high frequency range, but becomes lower in a secondary vibration range (40-200 Hz) (see FIG. 23). Conversely, if the frequency of the fluid in the orifices 209a is shifted toward a higher frequency, then the dynamic spring constant becomes higher in a high frequency range, but becomes lower in a secondary vibration range (see FIG. 24). This effect is utilized when the dynamic spring constant is to be lowered at a certain frequency.

In the fluid-filled vibroisolating device shown in FIG. 9, each of the orifices 209a flares from the first fluid chamber 207 toward the movable plate 210a. Therefore, the pressure-bearing area of the movable plate 210a is large and the area of contact between the movable plate 210a and the partition 206a which holds the movable plate 210a is small. Consequently, when vibration with a small amplitude at medium and high frequencies is applied, the movable plate 210a is smoothly moved, thus preventing the dynamic spring characteristics from being lowered.

Figure 25:
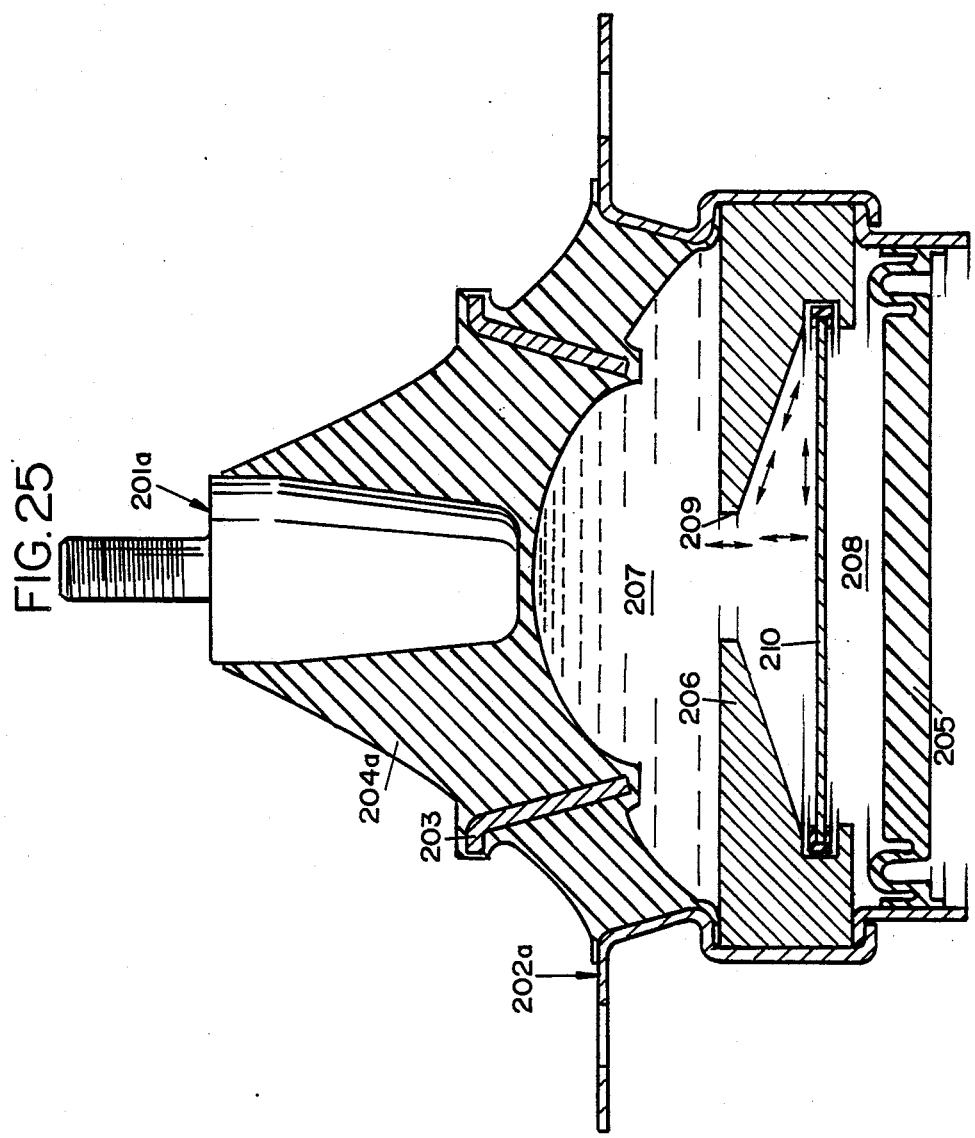
FIG. 25 is a cross-sectional view of a fluid-filled vibroisolating device shown as a comparative example with respect to the second embodiment of FIG. 9.

FIG. 25 shows, by way of comparison, a fluid-filled vibroisolating device having a single antiresonant orifice 209. When vibration is applied, the fluid between the movable plate 210 and the orifice 209 makes complex motions as indicated by the arrows, and hence such fluid motions are slightly dampened, with the result that the dynamic spring characteristics is lowered in the second vibration range. In order to obtain good dynamic spring characteristics, therefore, the antiresonant orifice should preferably be composed of a combination of orifices.

Figure 10:
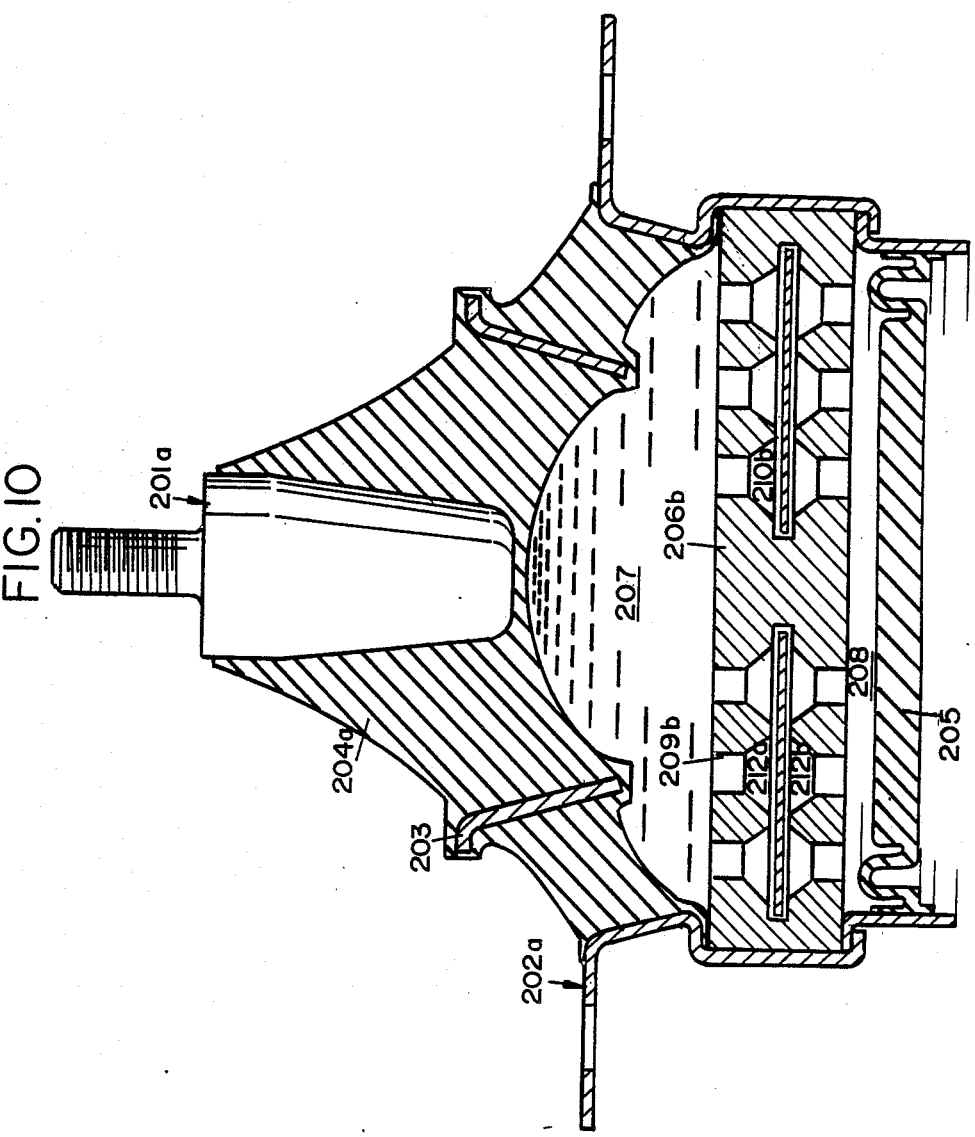
FIG. 10 is a cross-sectional view of a fluid-filled vibroisolating device according to a first modification of the second embodiment shown in FIG. 9.
Figure 11:
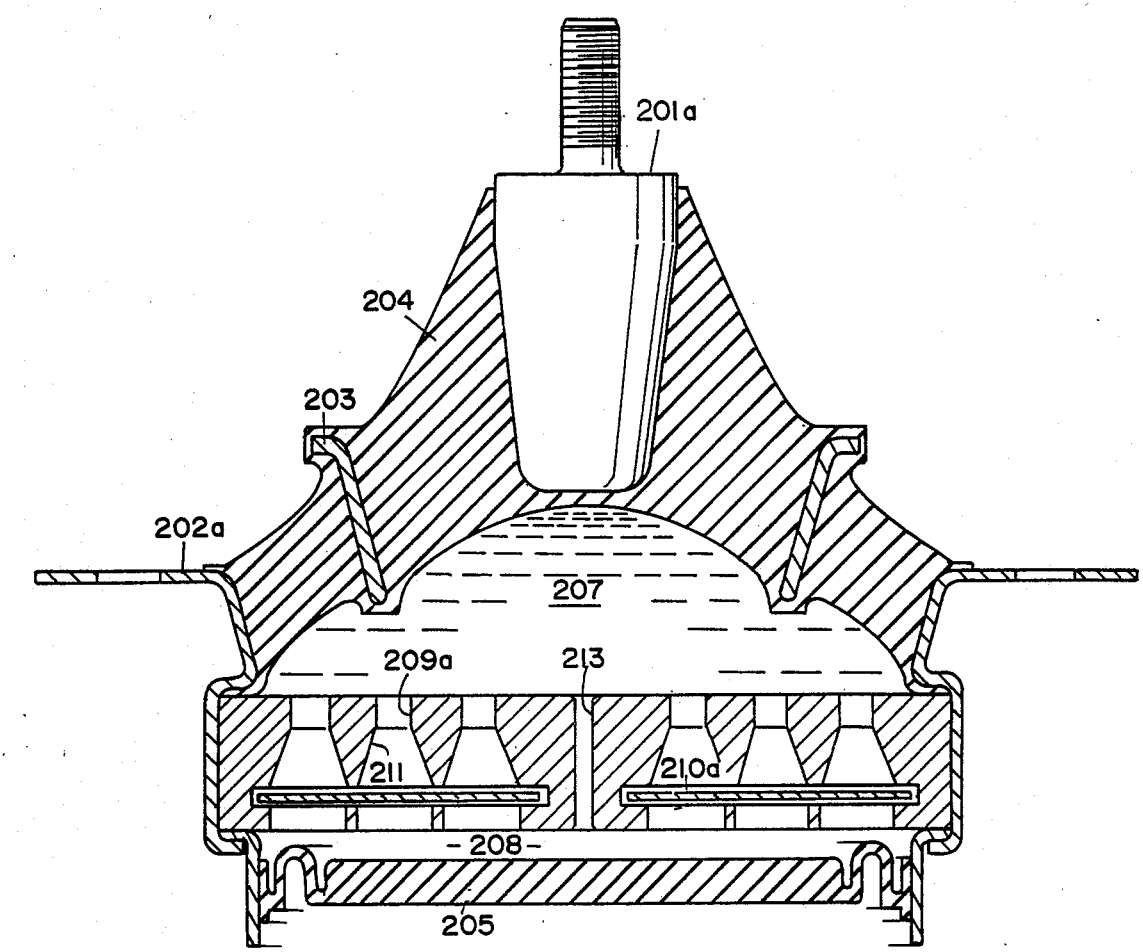
FIG. 11 is a cross-sectional view of a fluid-filled vibroisolating device according to a second modification of the second embodiment.

FIG. 10 shows a fluid-filled vibroisolating device according to a first modification of the second embodiment shown in FIG. 9. Each of orifices 209b in a partition 206b has flaring portions 212a, 212b flaring toward a movable plate 210b;

FIG. 11 illustrates a fluid-filled vibroisolating device according to a second modification having a low-frequency orifice 213 defined centrally through the partition and having upper and lower openings opening into the fluid chambers 207, 208, respectively. The orifice 213 serves as a flow regulating means or low-frequency damping means for improving damping characteristics at low frequencies below 20 Hz, for example.

Figure 12:
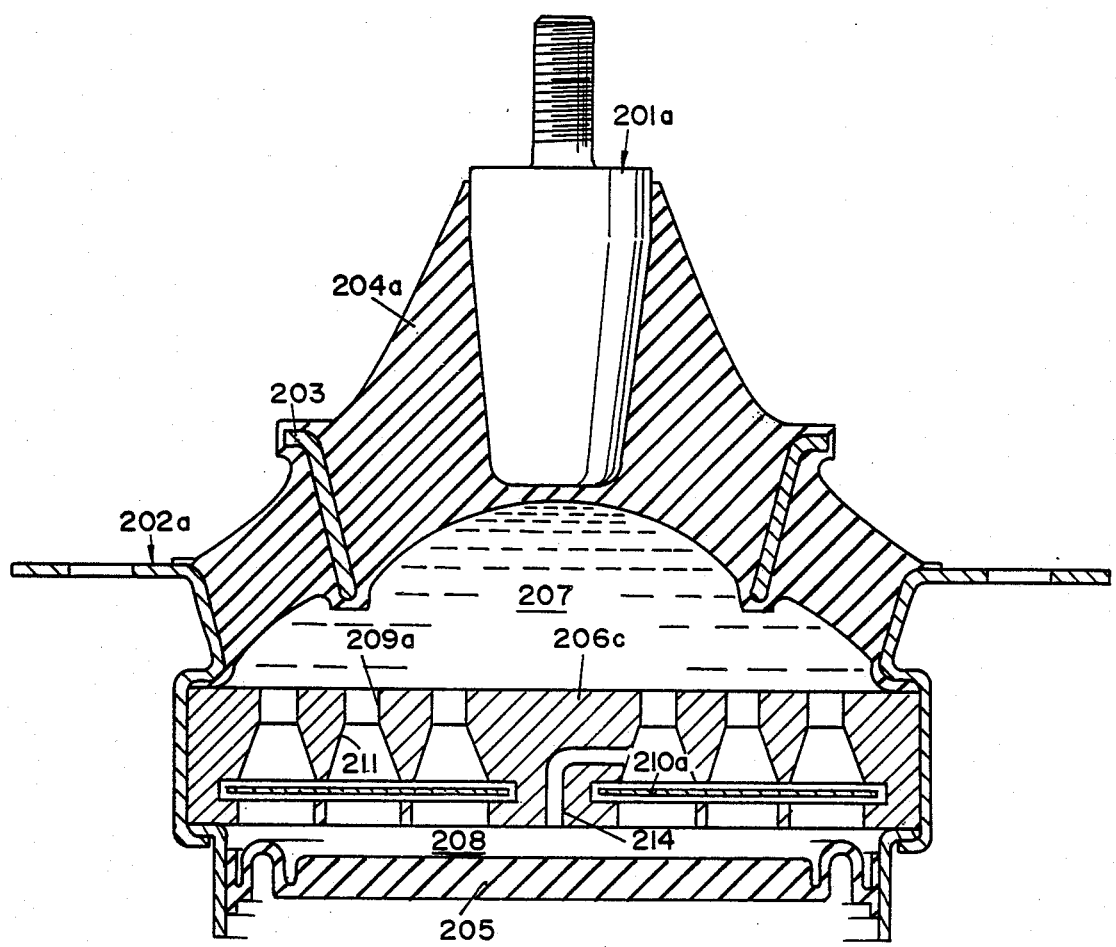
FIG. 12 is a cross-sectional view of a fluid-filled vibroisolating device according to a third modification of the second embodiment.

FIG. 12 shows a fluid-filled vibroisolating device according to a third modification. The fluid-filled vibroisolating device has a low-frequency orifice 214 defined centrally in a partition 206c and extending from a flaring portion of an orifice near the elastomeric member toward a fluid chamber near the diaphragm. The fluid-filled vibroisolating device therefore has high damping characteristics with respect to low-frequency vibration applied with a large amplitude.

Figure 13:
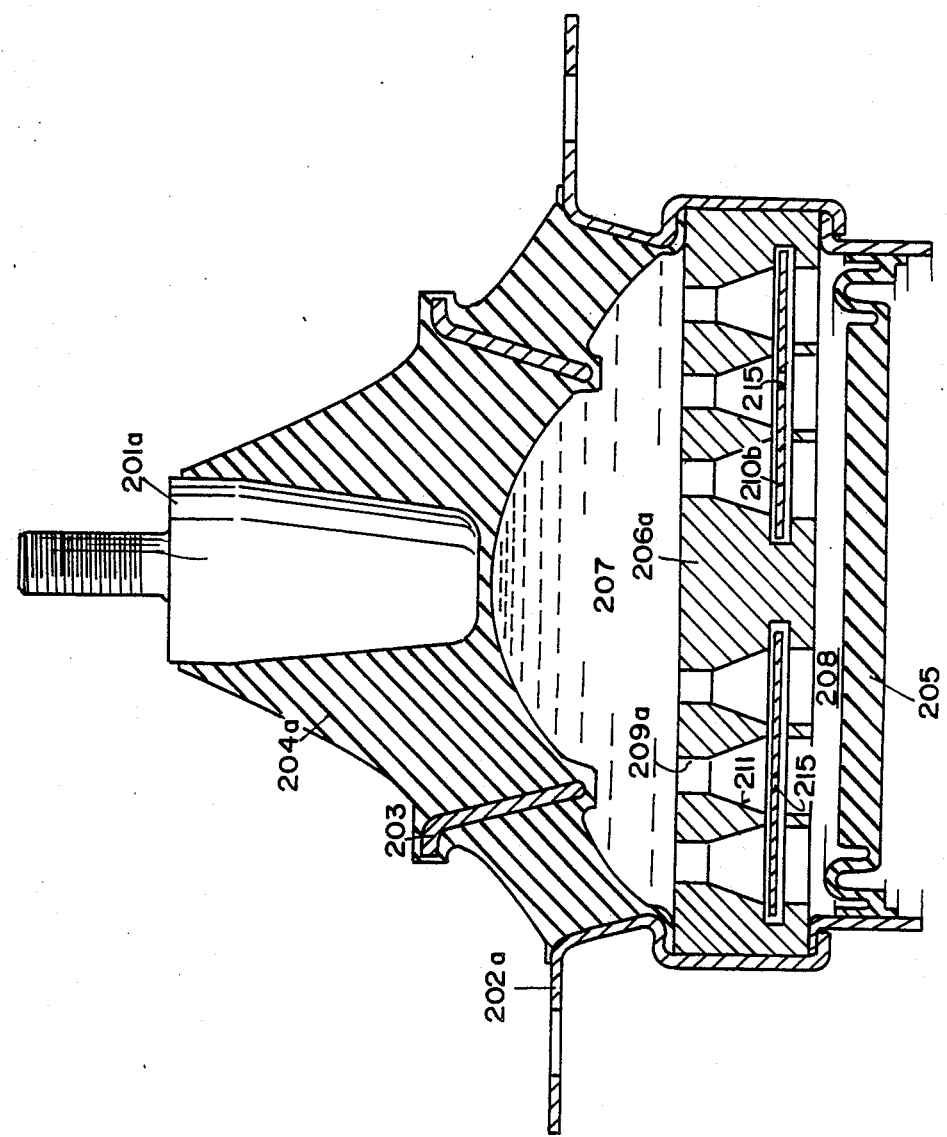
FIG. 13 is a cross-sectional view of a fluid-filled vibroisolating device according to a fourth modification of the second embodiment.

FIG. 13 shows a fluid-filled vibroisolating device according to a fourth modification. The fluid-filled vibroisolating device has low-frequency orifices 215 defined in a movable plate 210b at positions in selected ones of the orifices 209a in the partition 206a. The fluid-filled vibroisolating device also has high damping characteristics with respect to low-frequency vibration applied with a large amplitude.

Figure 14:
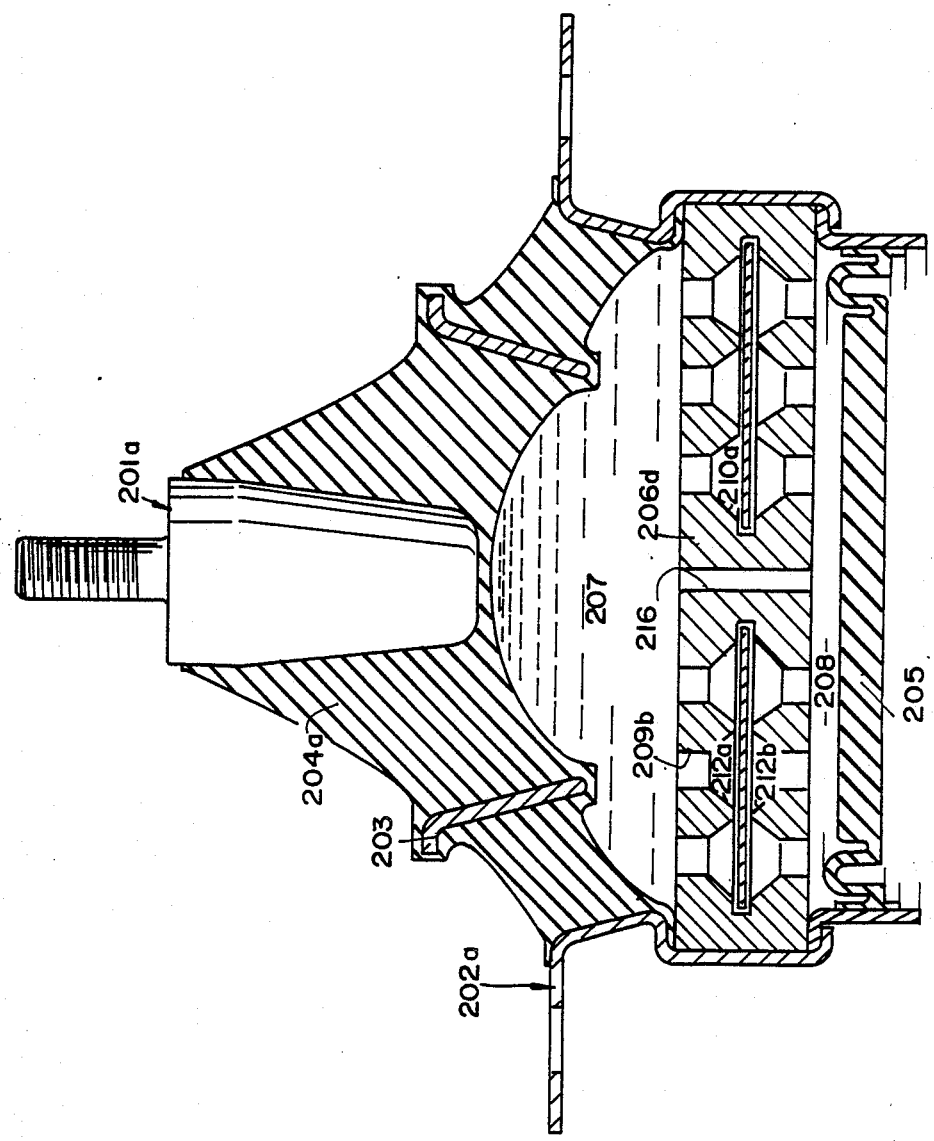
FIG. 14 is a cross-sectional view of a fluid-filled vibroisolating device according to a fifth modification of the second embodiment.

A fluid-filled vibroisolating device according to a fifth modification shown in FIG. 14 is similar to the fluid-filled vibroisolating device shown in FIG. 10, but differs therefrom in that a low-frequency orifice 216 is defined centrally through a partition 206d. The fluid-filled vibroisolating device also has high damping characteristics with respect to low-frequency vibration applied with a large amplitude.

Figure 15:
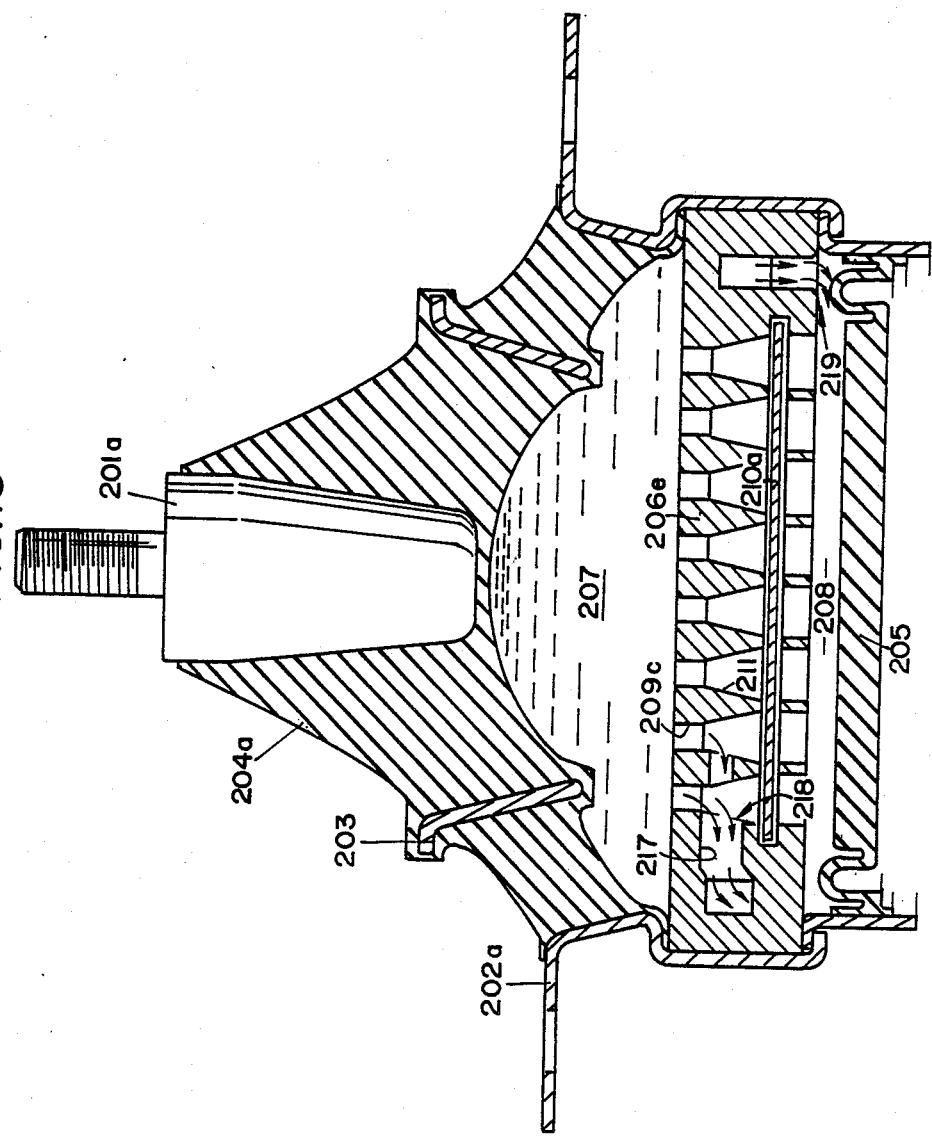
FIG. 15 is a cross-sectional view of a fluid-filled vibroisolating device according to a sixth modification of the second embodiment.

FIG. 15 shows a fluid-filled vibroisolating device according to a sixth modification. A partition 206e has a low-frequency orifice 218 defined therein and including an opening 217 connected to the flaring portion of an orifice 209c near the outer periphery of the partition 206e and the elastomeric member 204a, and extending through the outer periphery of the partition 206e to an opening 219 which opens to the fluid chamber 208 near the diaphragm 205. The fluid-filled vibroisolating device provides very high damping capability in a low frequency range.

Figure 16:
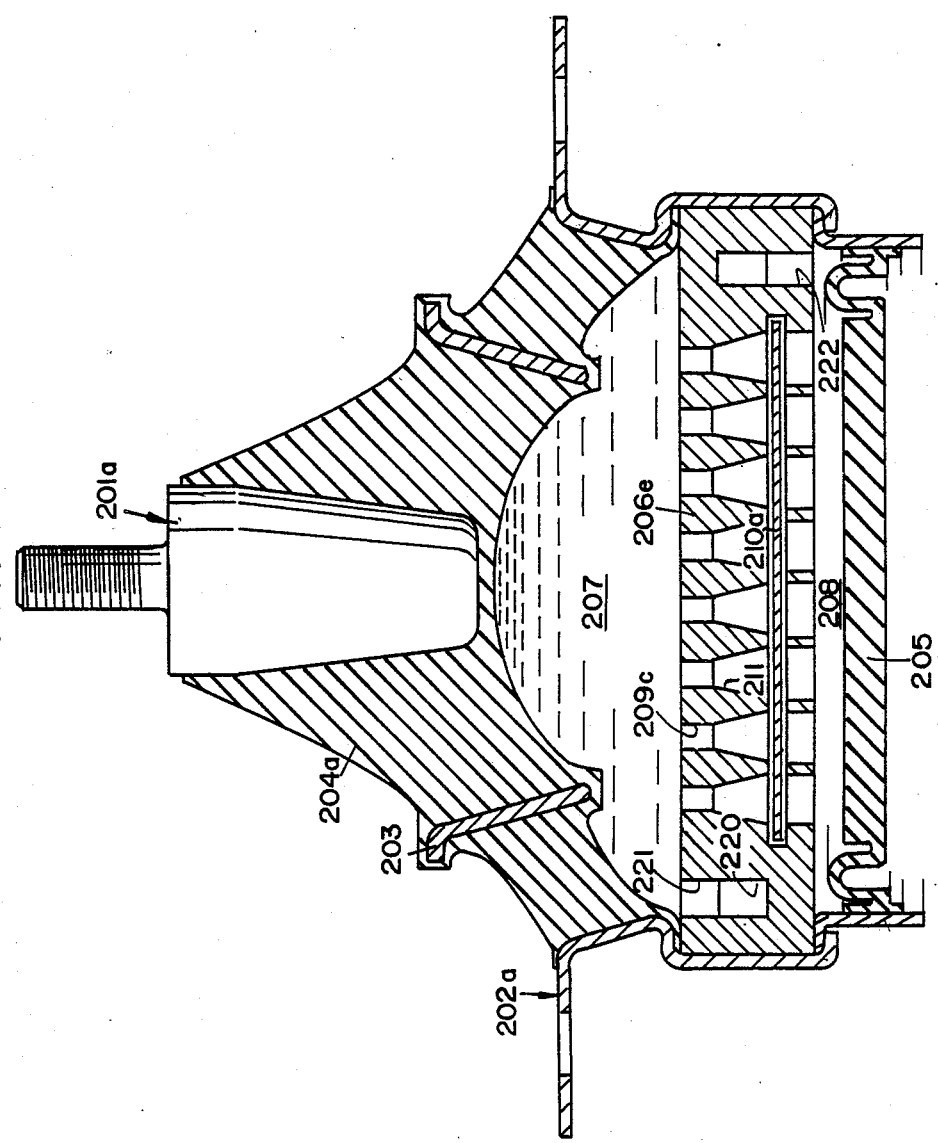
FIG. 16 is a cross-sectional view of a fluid-filled vibroisolating device according to a seventh modification of the second embodiment.

FIG. 16 shows a fluid-filled vibroisolating device in accordance with a seventh modification. A partition 206e has a low-frequency orifice 220 defined in the outer periphery thereof and including an opening 221 bear the elastomeric member 204a, and extending through the outer periphery of the partition 206e to an opening 222 which opens to the fluid chamber 208 near the diaphragm 205. The fluid-filled vibroisolating device also provides very high damping capability in a low frequency range.

Figure 17:
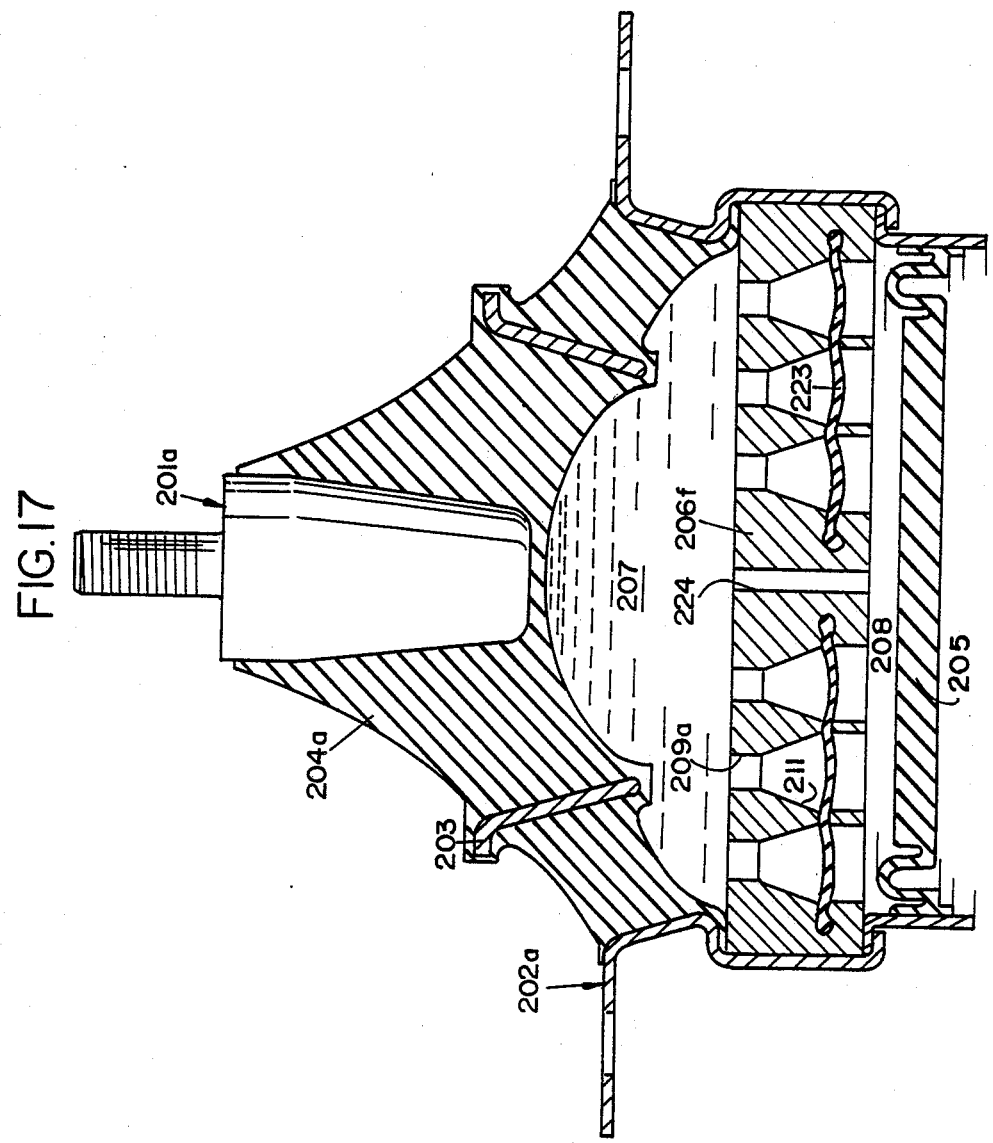
FIG. 17 is a cross-sectional view of a fluid-filled vibroisolating device according to an eighth modification of the second embodiment.

According to an eighth modification shown in FIG. 17, a flexible movable plate 223 is held in a partition 206f in a loose condition, and the partition 206f has a low-frequency orifice 224 defined centrally through the partition 206f.

Figure 18:
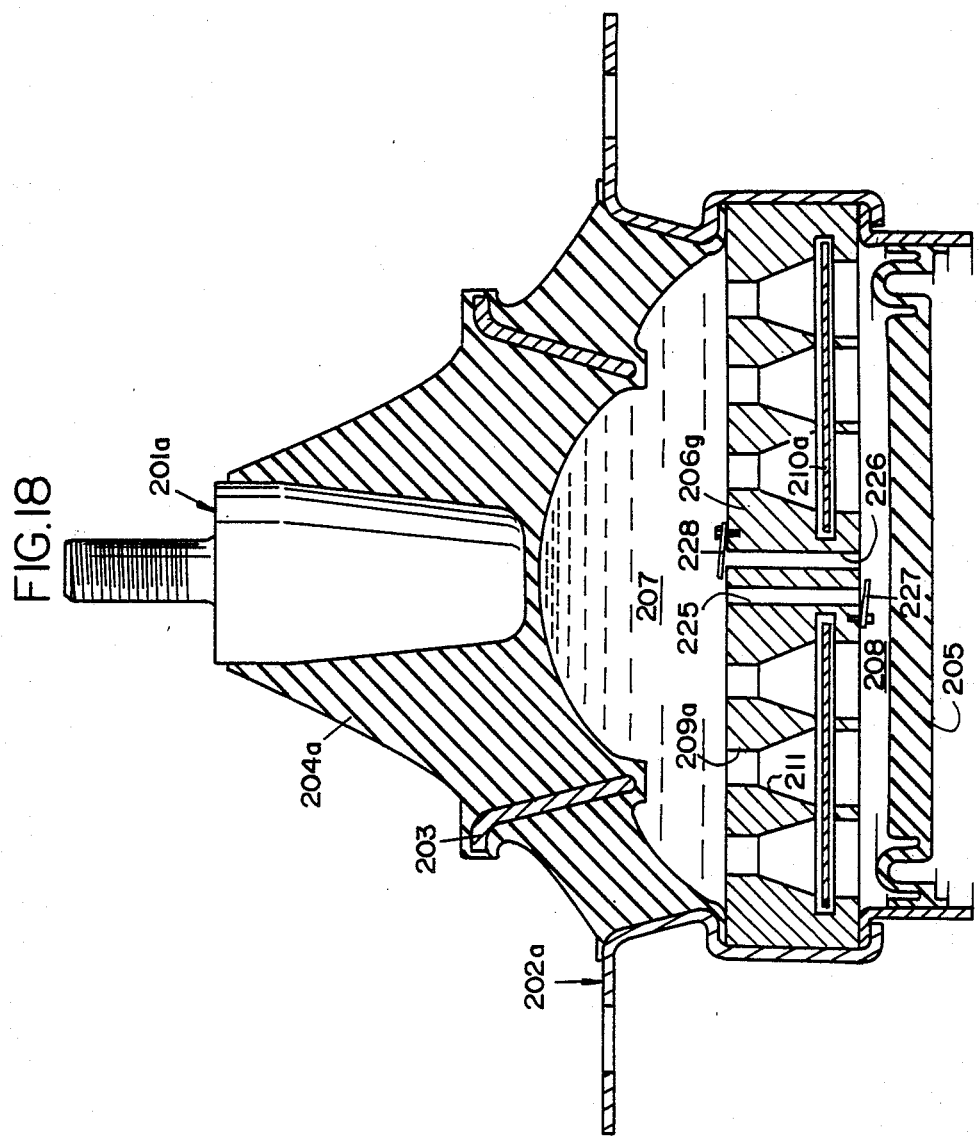
FIG. 18 is a cross-sectional view of a fluid-filled vibroisolating device according to a ninth modification of the second embodiment.

FIG. 18 is illustrative of a fluid-filled vibroisolating device according to a ninth modification. In this modification, a pair of low-frequency orifices 225, 226 is defined centrally through a partition 206g, and oppositely directed check valves 227, 228 are associated respectively with the orifices 225, 226. By suitably adjusting the rigidity of the check valves 227, 228, the fluid-filled vibroisolating device can provide good damping characteristics in a wide frequency range.

Figure 19:
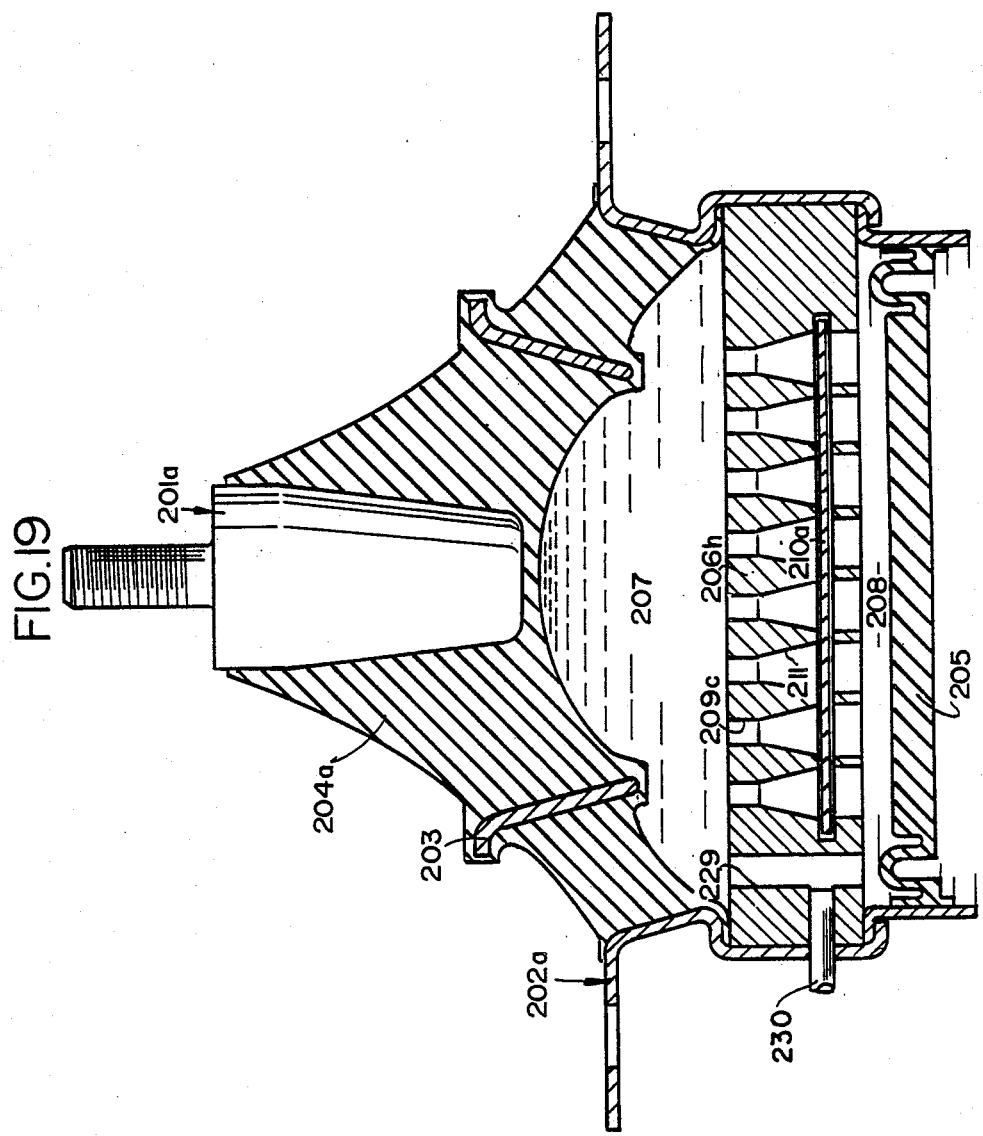
FIG. 19 is a cross-sectional view of a fluid-filled vibroisolating device according to a tenth modification of the second embodiment.

FIG. 19 illustrates a fluid-filled vibroisolating device according to a tenth modification. A partition 229 has a low-frequency orifice 229 defined therethrough, and a control valve 230 is supported on the partition 229 for movement into and out of the orifice 229 to adjust the cross-sectional area of the fluid flow passage through the orifice 229. When a large dynamic input load is applied to the fluid-filled vibroisolating device, suitable damping characteristics can be provided by operating the control valve 230.

Figure 20:
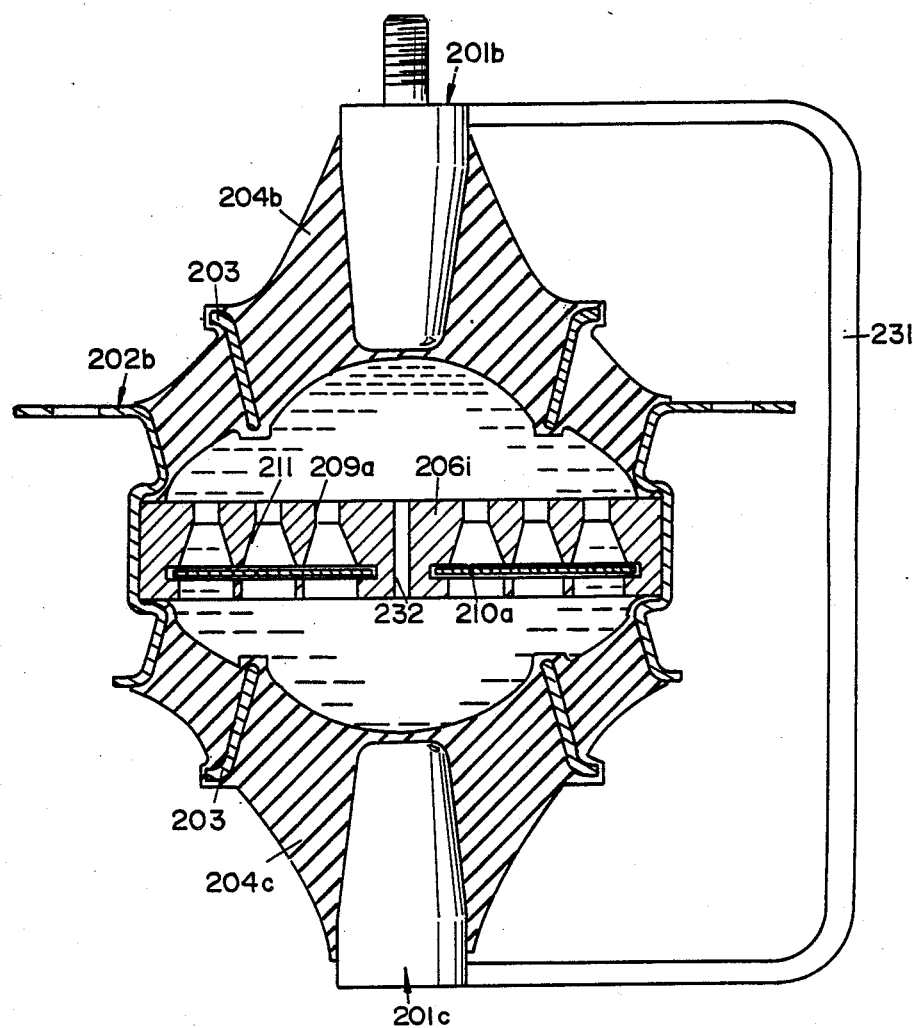
FIG. 20 is a cross-sectional view of a fluid-filled vibroisolating device according to an eleventh modification of the second embodiment.

FIG. 20 shows a fluid-filled vibroisolating device according to an eleventh modification which has a second fluid chamber which is identical to the first fluid chamber described above in the previous modifications. Confronting joint members 201b, 201c are interconnected by a link member 231, and also coupled to a support member 202b by respective elastomeric members 204b, 204c. A partition 206i has a low-frequency orifice 232 defined centrally therethrough. With this construction, even when a large tensile input load is applied, since the fluid pressure in one of the fluid chambers is positive, the fluid chamber is prevented from developing cavitation. Thus, good damping characteristics can be obtained with respect to large loads.

Figure 21:
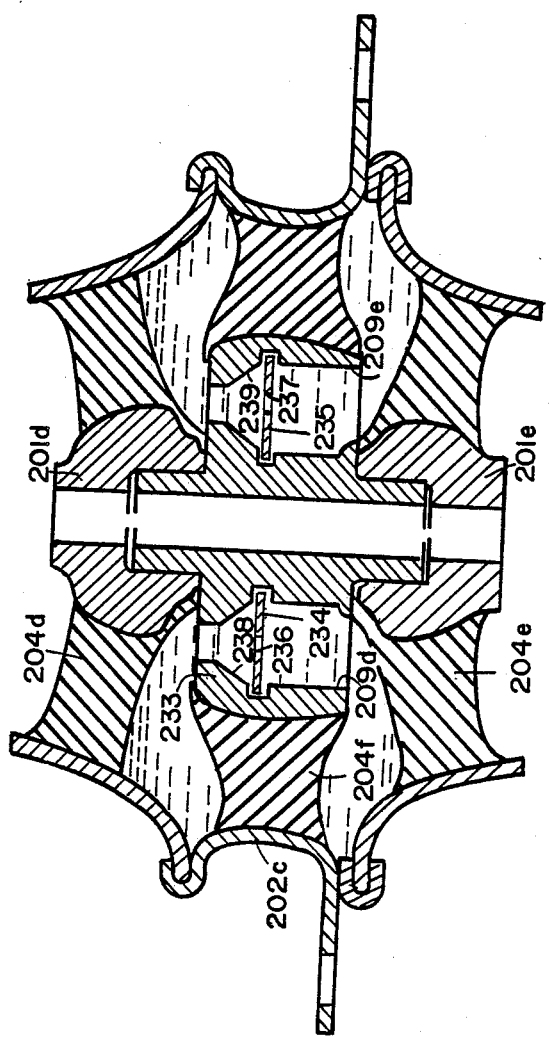
FIG. 21 is a cross-sectional view of a fluid-filled vibroisolating device according to a twelfth modification of the second embodiment.

FIG. 21 shows a fluid-filled vibroisolating device according to a twelfth modification. In this modification, a pair of joint members 201d, 201e is interconnected with a partition 233 sandwiched therebetween. Annular elastomeric members 204e, 204f are interposed between the joint members 201d, 201e, the partitions 233 and a support member 202c. The partition 233 has a plurality of orifices 209d, 209e in which there are loosely fitted movable plates 234, 235 lying across the orifices 209d, 209e, the movable plates 234, 235 having respective low-frequency orifices 236, 237. The orifices 209d, 209e have respective flaring portions 238, 239 flaring from the ends near the elastomeric member 204d toward the movable plates 234, 235.

Figure 22:
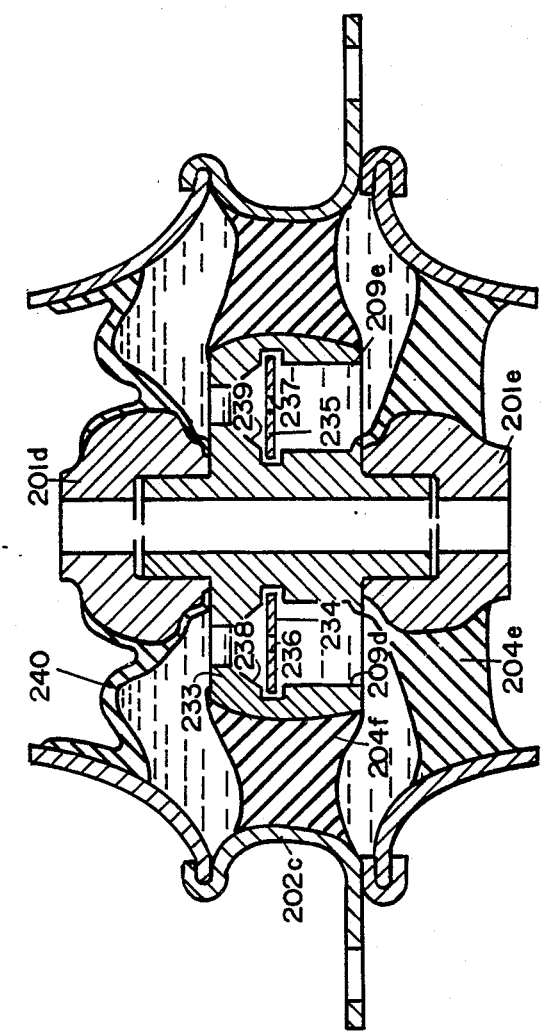
FIG. 22 is a cross-sectional view of a fluid-filled vibroisolating device according to a thirteenth modification of the second embodiment.

FIG. 22 shows a fluid-filled vibroisolating device according to a thirteenth modification which differs from the twelfth modification in that the elastomeric member 204d of FIG. 21 is replaced with a diaphragm 240.

With the second embodiment and its first through thirteenth modifications, as described above, the elastomeric member interposed between the joint member and the support member constitute at least part of the chamber wall of a corresponding one of the first and second fluid chambers disposed adjacent to each other with the partition therebetween and filled with the noncompressible fluid. By appropriately selecting the effective length and the inlet area of the orifices, the elastomeric member is prevented from resonating through the resonant action of the fluid in the orifices. The flaring shape of the orifices allows the movable plate to move smoothly for thereby lowering the dynamic spring constant when vibration with a small amplitude at a high frequency is applied. The fluid-filled vibroisolating device is simple in structure and compact since only the movable plate is added and the orifices are shaped to flaring contour.

Fluid-filled vibroisolating devices according to a third embodiment and a modification thereof will be described with reference to FIGS. 26 through 29.

Figure 26:
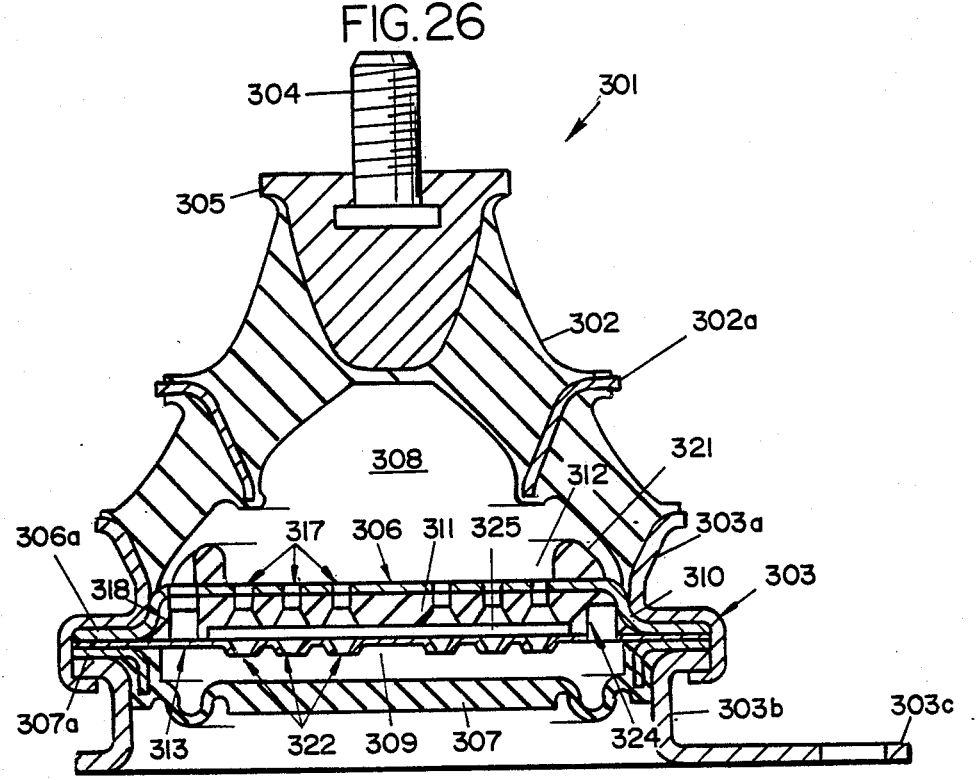
FIG. 26 is a cross-sectional view of a fluid-filled vibroisolating device according to a third embodiment of the present invention.

FIG. 26 shows in vertical cross section a fluid-filled vibroisolating device in accordance with a third embodiment of the present invention, the fluid-filled vibroisolating device being used as an engine mount.

As shown in FIG. 26, the fluid-filled vibroisolating device, generally denoted at 103, comprises a conical cylindrical elastomeric member 302 of rubber having a large wall thickness and a housing 303 made of a rigid material such as steel sheet. The elastomeric member 302 may have an intermediate reinforcing member 302a of the first and second embodiments. The housing 303 comprises a substantially cylindrical upper housing 303a and a substantially cylindrical lower housing 303b. The lower housing 303b has a flange 303c to be attached to a support body such as a vehicle frame. In the third embodiment, therefore, the housing 303 serves as a support member.

The outer peripheral surface of the lower end of the elastomeric member 302 is bonded to the inner peripheral surface of the upper end of the upper housing 303a upon vulcanization of the elastomeric member 302. An attachment member or joint member 305 having a bolt 304 for being fixed to a vibrating body or an engine is bonded to the upper end of the elastomeric member 302 upon vulcanization of the elastomeric member 302. The engine is thus supported on the vehicle frame through the elastomeric member 302, which is elastically deformed dependent on vibration of the engine.

A partition 306 is disposed below the elastomeric member 302 in covering relation to the lower opening of the elastomeric member 302. A diaphragm 207 of rubber having an easily deformable thin portion is located underneath the partition 306. The partition 306 and the diaphragm 307 has on their peripheries attachment flanges 306a, 307a clamped between the lower end of the upper housing 303a and the upper end of the lower housing 303b. The partition 306 and the diaphragm 307 are fixed to the housing 303 by deforming the lower end of the upper housing 303a over the upper end of the lower housing 303b thereby providing a fluidtight seal between and upper and lower housings 303a, 303b.

The engine mount 301 defines therein a fluidtight space or chamber surrounded by the elastomeric member 302 and the diaphragm 307 and divided into upper and lower or expandable/contractable main and auxiliary fluid chambers 308, 309 by the partition 306. The fluidtight space is filled with a noncompressible fluid such as oil, water, or the like.

The main fluid chamber 308 above the partition 306 is surrounded by the elastomeric member 302 and variable in its volume by elastic deformation of the elastomeric member 302 due to vibration of the engine. The auxiliary fluid chamber 309 below the partition 306 is surrounded by the diaphragm 307 which is easily elastically deformable. The area beneath the lower surface of the diaphragm 207 is vented to atmosphere. Therefore, the volume of the auxiliary fluid chamber 309 is freely variable by deformation of the diaphragm 307 dependent on the fluid pressure in the auxiliary fluid chamber 309.

Figure 27:
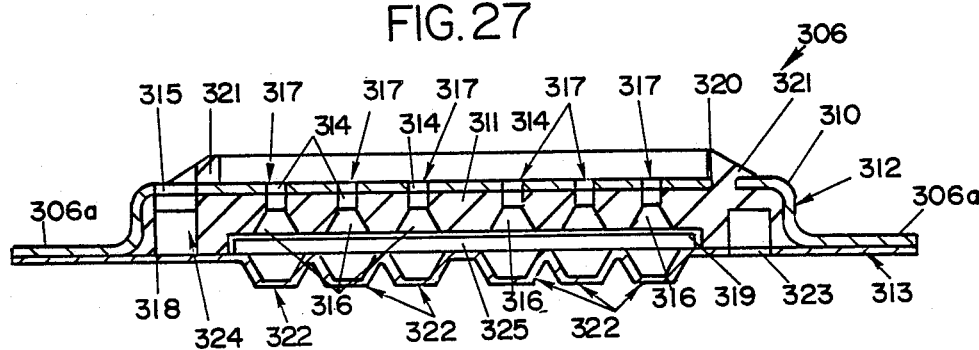
FIG. 27 is an enlarged vertical cross-sectional view of a partition employed in the fluid-filled vibroisolating device according to the third embodiment.
Figure 28:
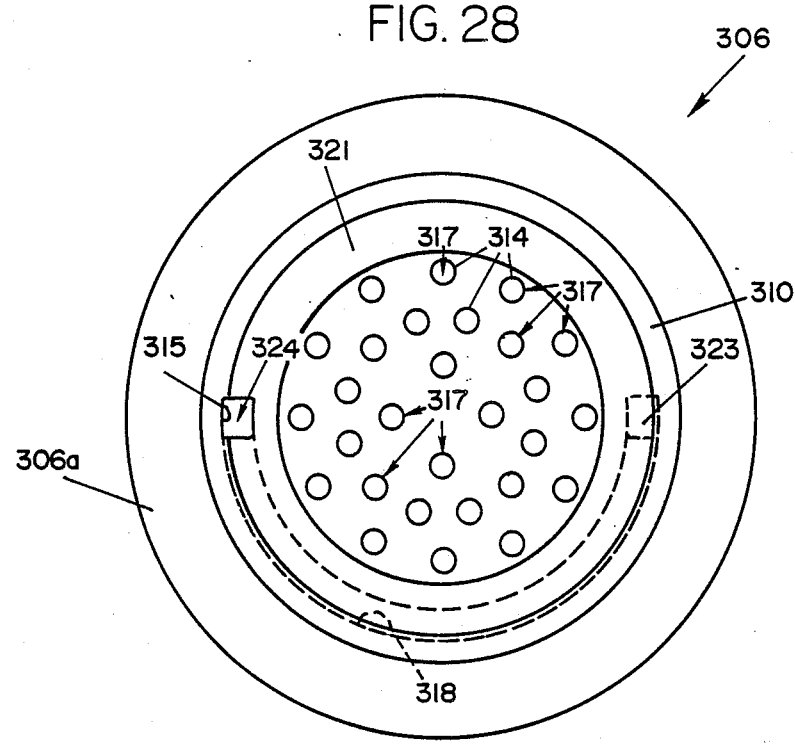
FIG. 28 is a plan view of the partition illustrated in FIG. 27.

As illustrated in FIGS. 27 and 28, the partition 306 is in the form of a relatively thick disc having an attachment flange 306a on its periphery. The partition 306 comprises an upper plate 312 including a base plate 310 in the form of a thin steel sheet with a layer 311 of rubber bonded thereto upon vulcanization, and a lower plate 313 in the form of a thin steel sheet.

The base plate 310 of the upper plate 312 is of hat shape having a flange on its peripheral edge and a number of circular openings 314 defined in its central area. The base plate 310 also has a rectangular opening 315 defined in one side of its top. The rubber layer 311 is filled in the recess of the base plate 310 and joined to the central lower surface of base plate 310. The rubber layer 311 has a number of orifices 316 connected respectively to the openings 314 of the base plate 310. The orifices 316 have tapered portions flaring away from the base plate 310 toward the lower end thereof. The openings 314 of the base plate 310 and the orifices 316 of the rubber layer 311 jointly provide relatively long upper orifices 317 extending vertically through the upper plate 312.

The rubber layer 311 has an arcuate groove 318 defined in its lower surface around its periphery, and a circular cavity 319 defined in its lower central surface. The groove 318 has an end communicating with the rectangular opening 315 defined in the base plate 310. The cavity 319 is of a size large enough to cover the area where the orifices 316 are defined. The rubber layer 311 has a portion projecting upwardly on the outer peripheral surface of the base plate 310 through an opening 320 defined in the peripheral portion of the top of the base plate 310. The projecting portion of the rubber layer 311 serves as a stopper 321 for preventing the elastomeric member 302 from being excessively deformed.

The lower plate 313 has tapered projecting portions aligned with the upper orifices 317 of the upper plate 317, i.e., the openings 314 of the base plate 310 and the orifices 316 of the rubber layer 311, and having their diameter progressively smaller downwardly. These tapered projections have respective lower orifices 322 opening downwardly. The lower orifices 322 have a relatively large diameter. The lower plate 313 has a rectangular opening 323 defined in one side thereof and held in registry with the other end of the arcuate groove 318 defined in the outer periphery of the lower surface of the rubber layer 311.

The partition 306 is constructed of the lower plate 313 and the upper plate 312 which is placed over the lower plate 313, the lower and upper plates 313, 312 having outer peripheral edges welded to each other. The upper orifices 317 of the upper plate 312 and the lower orifices 322 of the lower plate 313 jointly provide orifices which are effective in damping vibration in medium and high frequencies. The rectangular opening 315 of the base plate 310 of the upper plate 312, the groove 318 of the rubber layer 311, and the rectangular opening 323 of the lower plate 313 jointly provide an orifice providing fluid communication between the main and auxiliary fluid chambers 308, 309 and serving as a means for damping vibration in low frequencies.

Between the upper and lower plates 312, 313, the cavity 319 defined in the lower surface of the rubber layer 311 provides a thin disc-shaped space in which a movable or vibratable plate 325 in the form of a thin disc is housed. The vibratable plate 325 has a thickness smaller than the thickness of the disc-shaped space, i.e., the depth of the cavity 319. Therefore, the vibratable plate 325 is vertically movable between the lower surface of the upper plate 312 and the upper surface of the lower plate 313. The fluid pressure in the main fluid chamber 308 acts on the upper surface of the vibratable plate 325 through the upper orifices 317, and the fluid pressure in the auxiliary fluid chamber 309 acts on the lower surface of the vibratable plate 325 through the lower orifices 322.

Operation of the engine mount thus constructed will be described below.

When the engine rotates in medium and high speed ranges as while the motor vehicle is running normally, vibration with a small amplitude at medium and high frequencies is applied to the engine mount 301. Therefore, the elastomeric member 301 is elastically deformed to a small degree. As a result, the volume of the main fluid chamber 308 is varied to vary the fluid pressure therein. The change in the fluid pressure is transmitted through the upper orifices 317 of the partition 306 to the space between the upper and lower plates 312, 313. The vibratable plate 325 in that space is vertically vibrated dependent on the transmitted change in the fluid pressure, thereby taking up the change in the volume of the main fluid chamber 308. As the vibratable plate 323 is thus vibrated, the fluid flows through the lower orifices 322 to vary the fluid pressure in the auxiliary fluid chamber 309. The change in the fluid pressure in the auxiliary fluid chamber 309 is taken up by the change in the volume of the auxiliary fluid chamber 309 which is caused by deformation of the diaphragm 307.

The elastic deformation of the elastomeric member 302 is allowed without any substantial resistance by the vibration of the vibratable plate 325, so that the vibration applied at the time can be absorbed by the elasticity of the elastomeric member 302. When the elastomeric member 302 resonates with the engine vibration, the fluid flowing through the upper orifices 317 also resonates with the vibration at a certain phase difference, with the result that the resonant vibration of the elastomeric member 302 is suppressed.

When vibration with a very large amplitude is applied as while the engine is being cranked or violently shaked during normal travel of the vehicle, the elastomeric member 302 is largely deformed to largely vary the volume of the main fluid chamber 308. In this case, the change in the volume of the main fluid chamber 308 cannot be absorbed even by the vertical movement of the vibratable plate 325. The fluid is forced to flow through the slender and long low-frequency orifice 324 which presents resistance to the flow of the fluid for dampen the applied vibration.

In order for the fluid flowing through the orifices 317 to resonate at a certain frequency, it is necessary that the effective cross-sectional shape of the orifices 317 be exactly established and their length be sufficiently long. Moreover, in order to allow the elastomeric member 302 to be elastically deformed without being subjected to resistance in medium and high frequency ranges, the total cross-sectional area of the upper and lower orifices 317, 322 serving as the medium- and high-frequency orifices should be sufficiently large to reduce resistance to the fluid flowing through these orifices. Therefore, if the orifices 317, 322 should be small in diameter, the number of these orifices should be increased. So that the fluid flowing between the orifices 317, 322 and the space holding the vibratable plate 325 therein will not produce swirls, the orifices 317, 322 should be of a tapered shape.

The low-frequency orifice 324 should be small in cross-sectional area and very long so that the fluid flowing therethrough will sufficiently be dampened.

The upper plate 312 with the upper orifices 317 and the low-frequency orifice 324 defined therein is constructed of the base plate 310 in the form of a thin steel sheet and the rubber layer 311 bonded thereto. Therefore, the effective cross-sectional shapes of the orifices 317, 324 can accurately be determined by the openings 314, 315 defined in the base plate 310. Since the longitudinal shapes of the orifices 317, 324 are defined by the rubber layer 311 which can easily be formed, the orifices 317, 324 can easily be shaped to complex configurations such as tapered contours. Because the portions between the upper orifices 317 and the portions between the orifices 317, 324 may be made thin, the number of medium- and high-frequency orifices may be increased to increase the total cross-sectional area thereof.

The rigidity of the partition 306 is maintained by the base plate 310 and the lower plate 313 which are of steel sheets. Since the thickness of the partition 306 is given by the rubber layer 311, the partition 306 may be lightweight but have the long orifices 317, 324.

The upper plate 312 with the rubber layer 311 bonded to the steel base plate 310 makes it possible to provide the rubber stopper 321 on the outer periphery of the upper surface thereof. When vibration with a large amplitude is applied, the inner surface of the elastomeric member 302 engages the stopper 321 to prevent the elastomeric member 302 from being excessively deformed, and hence the attachment member 305 is prevented from hitting and damaging the partition 306. Since the rubber layer 311 provides a seal between the upper and lower plates 312, 313, no other seal member is required therebetween. The seal member providing a seal between the upper plate 312 and the housing 303 may be integrally formed with the upper plate 312 by the rubber layer 311. Accordingly, the number of parts of the fluid-filled vibroisolating device is reduced.

Figure 29:
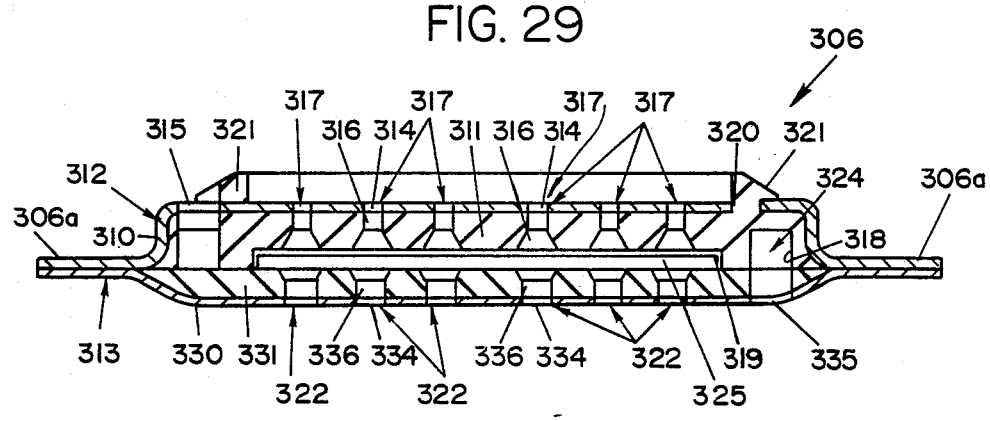
FIG. 29 is a vertical cross-sectional view of a partition according to a modification of the partition shown in FIG. 27.

FIG. 29 shows a partition 306 according to a modification for use in the engine mount 301 shown in FIG. 26. Those parts in FIG. 29 which correspond to those of the partition 306 shown in FIGS. 27 and 28 are denoted by corresponding reference numerals.

The partition 306 of FIG. 29 includes the same upper plate 312 as that of FIGS. 27 and 28, and a lower plate 313 comprising a base plate 330 in the form of a thin steel sheet and a rubber layer 331 bonded thereto upon vulcanization.

More specifically, the base plate 330 is in the form of a thin dish having a flange on its outer peripheral edge and has a number of circular openings 334 defined in a central bottom thereof. The base plate 330 also has a rectangular opening 335 defined in one side of its bottom and coupled to the other end of the groove 318 defined in the outer periphery of the lower surface of the upper plate 312. The rubber layer 331 is filled in the cavity of the base plate 330 and has a number of orifices 336 held in registry with the respective openings 334 of the base plate 330. The orifices 336 have upper ends opening at the upper surface of the rubber layer 331 and having tapered portions flaring upwardly. The openings 334 of the base plate 330 and the orifices 336 of the rubber layer 331 jointly provide lower orifices extending vertically through the lower plate 313.

The other structural details of the partition 306 shown in FIG. 29 are the same as those of the partition 306 shown in FIGS. 27 and 28.

With a fluid-filled engine mount 301 incorporating the partition 306 shown in FIG. 29, the lower orifices 322 of the lower plate 313 have accurate cross-sectional shapes and sufficient lengths so that the fluid flowing through the lower orifices can develop resonance. Therefore, the fluid is caused to resonate in the entire medium- and high-frequency orifices comprising the upper and lower orifices 317, 322, with the consequence that the resonance of the elastomeric member 302 can reliably be suppressed.

The space in which the vibratable plate 325 is housed and vibratable has its entire peripheral edge defined by the rubber layers 311, 331. As a consequence, when the vibratable plate 325 is vibrated, the vibratable plate 325 is brought into contact with the rubber layers 311, 331, and hence large hitting sounds or noise is reliably prevented from being produced.

In the third embodiment, the vibratable plate 325 is held in the partition 306. The present invention is however not limited to such construction, but may also be applied to an engine mount which absorbs applied vibration only with orifices. In such an alternative, the lower plate 313 may be dispensed with.

The mount of the third embodiment is not limited to an automotive engine mount, but may be used as any of various fluid-filled vibroisolating devices such as a suspension mount.

With the fluid-filled vibroisolating device of the third embodiment, as described above, the partition disposed between the main and auxiliary fluid chambers and having orifices providing fluid communication between the main and auxiliary fluid chambers comprises the base plate in the form of a thin metallic sheet and the rubber layer bonded thereto. Since the thickness of the partition is maintained by the rubber layer, the partition may be lightweight but still thick. Consequently, the orifices defined in the partition may sufficiently be long. Since the rubber can easily be formed to desired shape, orifices of complex shape may be defined in the partition. Moreover, burrs can easily be removed from the partition and the attachment surface of the partition for attachment to the support member or the like is not required to be machined. Therefore, the number of processing steps required after the partition has been fabricated is reduced, and the cost of manufacture is lowered.

Inasmuch as the rubber stopper and seal member can integrally be formed with the partition, the number of parts of the partition is also reduced. Where the vibratable plate is disposed in the partition, since the partition is held by the rubber layer or layers, any strong hitting sounds or noise which would otherwise be produced by the vibration of the vibratable plate can effectively be eliminated.

The fluid-filled vibroisolating device can be designed with greater freedom and has good vibration absorbing or damping characteristics.

The partition 306 of the third embodiment may be incorporated in the fluid-filled vibroisolating devices of the first and second embodiment.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A fluid-filled vibroisolating device comprising:
   a joint member adapted to be joined to a vibrating body;
   a support member adapted to be supported on a supporting body and defining an expandable and contractable auxiliary fluid chamber filled with a fluid;
   An elastomeric member interconnecting said joint and support members and disposed in a vibrating, direction in which the vibrating body vibrates, said elastomeric member, said joint member, and said support member jointly defining an expandable and contractable main fluid chamber filled with fluid.
   a partition mounted in said support member and separation said main and auxiliary fluid chambers from each other;
   said partition having a storage chamber defined therein and held in communication with said main and auxiliary fluid chambers through a plurality of first orifices opening into said main fluid chamber and a plurality of second orifices opening into said auxiliary fluid chamber in coaxial relation to the first orifices as pairs; and
   flow regulating means comprising a movable plate movably disposed in said storage chamber and movable at least axially of said first and second orifices dependent on the difference between fluid pressures in said main and auxiliary fluid chambers, said first and second orifices having openings opening toward said movable plate, said openings of at least one of said first and second orifices having tapered portions flaring toward said movable plate.

2. A fluid-filled vibroisolating device according to claim 1, wherein said flow regulating means further comprises low-frequency damping means having first and second openings opening into said main and auxiliary fluid chambers to provide fluid communication between said main and auxiliary fluid chambers.

3. A fluid-filled vibroisolating device according to claim 2, wherein said first opening of said low-frequency dampling means opens into one of said first orifices.

4. A fluid-filled vibroisolating device according to claim 2, wherein said low-frequency damping means is defined in said movable plate and opens into at least a pair of orifices of said first and second orifices in pairs.

5. A fluid-filled vibroisolating device according to claim 4, further comprising a second joint member and a second elastomeric member which are substantially identical to said joint member, and said elastomeric member for defining said main fluid chamber therein, wherein said auxiliary fluid chamber being partially defined by said second joint member and said second elastomeric member, wherein said joint members being disposed in confronting relation to each other and said partition being partially sandwiched by said two joint members.

6. A fluid-filled vibroisolating device according to claim 5, further comprising an annular elastomeric member interposed between said support member and said partition.

7. A fluid-filled vibroisolating device according to claim 2, wherein said low-frequency damping means comprises a passage defined in said partition along an outer periphery thereof.

8. A fluid-filled vibroisolating device according to claim 7, wherein said first opening of said low-frequency damping means opens into at least one of said first orifices.

9. A fluid-filled vibroisolating device according to claim 2, wherein said low-frequency damping means comprises a pair of passages defined centrally in said partition and providing fluid communication between said main and auxiliary fluid chambers, said passages being associated with oppositely directed check valves, respectively.

10. A fluid-filled vibroisolating device according to claim 2, wherein said low-frequency damping means comprises a passage defined in said partition and providing fluid communication between said main and auxiliary fluid chambers, said passage having said first and second openings opening into said main and auxiliary fluid chambers, respectively, and a control valve disposed in said passage for regulating the cross-sectional area of said passage.

11. A fluid-filled vibroisolating device according to claim 2, wherein said movable plate of said flow regulating means comprises a flexible member held in said storage chamber in a loose condition.

12. A fluid-filled vibroisolating device according to claim 2, further including a second joint member and a second elastomeric member which are substantially identical to the joint member and the elastomeric member which define said main fluid chamber therein, said auxiliary fluid chamber being defined by said second joint member and said second elastomeric member, said joint members being disposed in confronting relation to each other, and interconnected by a link.

13. A fluid-filled vibroisolating device according to claim 1, wherein said elastomeric member includes a reinforcing member integrally formed therewith for preventing the elastomeric member from being collapsed.

14. A fluid-filled vibroisolating device according to claim 1, wherein said partition comprises an upper plate comprising a base plate in the form of a thin metallic sheet and an elastomeric body bonded thereto, and a lower plate comprising a thin metallic sheet.

15. A fluid-filled vibroisolating device according to claim 14, wherein said upper plate has said first orifices and said storage chamber defined therein, and said lower plate has said second orifices defined therein.

16. A fluid-filled vibroisolating device according to claim 14, wherein said upper plate has a stopper comprising a portion of said elastomeric body which projects through at least one opening defined in said base plate, for preventing said elastomeric member from being excessively deformed.

17. A fluid-filled vibroisolating device according to claim 14, wherein said lower plate comprises a base plate in the form of a thin metallic sheet and an elastomeric body bonded thereto.

* * * * *

UNITED STATES PATENT AND TRADEMARK OFFICE
CERTIFICATE OF CORRECTION

PATENT NO. : 4,903,951
DATED : February 27, 1990
INVENTOR(S) : MIYAMOTO et al.

It is certified that error appears in the above-identified patent and that said Letters Patent is hereby corrected as shown below:

On the cover page, Item [30], "62-48627" should read -- 63-48627 --.

Signed and Sealed this

Twenty-eighth Day of May, 1991

Attest:

HARRY F. MANBECK, JR.

*Attesting Officer*      *Commissioner of Patents and Trademarks*